(12) United States Patent
Kopko

(10) Patent No.: US 6,442,942 B1
(45) Date of Patent: *Sep. 3, 2002

(54) SUPERCHARGING SYSTEM FOR GAS TURBINES

(75) Inventor: William L. Kopko, Springfield, VA (US)

(73) Assignee: Enhanced Turbine Output Holding, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,154

(22) Filed: Dec. 30, 1999

Related U.S. Application Data

(63) Continuation-in-part of application No. 09/388,927, filed on Sep. 2, 1999, now Pat. No. 6,308,512.
(60) Provisional application No. 60/138,848, filed on Jun. 10, 1999, provisional application No. 60/139,894, filed on Jun. 22, 1999, provisional application No. 60/152,277, filed on Sep. 3, 1999, and provisional application No. 60/159,207, filed on Oct. 13, 1999.

(51) Int. Cl.[7] .............................. F02C 9/00; F02C 1/00
(52) U.S. Cl. .............................. 60/773; 60/726; 60/728
(58) Field of Search ............................ 60/39.03, 39.26, 60/726, 728, 773

(56) References Cited

U.S. PATENT DOCUMENTS

| | | | |
|---|---|---|---|
| 3,394,265 A | * | 7/1968 | Hendrickson ............... 290/2 |
| 3,796,045 A | | 3/1974 | Foster-Pegg |
| 4,027,407 A | | 6/1977 | Kiss |
| 4,702,074 A | | 10/1987 | Munk |
| 5,191,767 A | * | 3/1993 | Kane et al. ................... 60/728 |
| 5,435,122 A | * | 7/1995 | Ahlin et al. ................ 60/39.02 |
| 5,444,971 A | * | 8/1995 | Holenberger ............. 60/39.02 |
| 5,537,813 A | * | 7/1996 | Davis et al. ............... 60/39.05 |
| 5,622,044 A | | 4/1997 | Bronicki et al. |
| 6,308,512 B1 | * | 10/2001 | Kopko ....................... 60/39.03 |

OTHER PUBLICATIONS

Kolp, D.A. et al., "Advantages of Air Conditioning and Supercharging an LM6000 Gas Turbine Inlet", International Gas Turbine Institute, Paper No. 94–GT–425, Feb. 11, 1994, pp. 513–527.

Foster–Pegg, R.W., "Supercharging of Gas Turbines by Forced Draft Fans with Evaporative Intercooling", ASME Publication, Feb. 1965, pp. 1–12.

* cited by examiner

Primary Examiner—Charles G. Freay
(74) Attorney, Agent, or Firm—Rothwell, Figg, Ernst & Manbeck

(57) ABSTRACT

A supercharging system for gas turbine power plants. The system includes a supercharging fan and means for limiting turbine power output to prevent overload of the generator at lower ambient temperatures. Possible means for limiting power output include burner control, inlet temperature control, control of supercharging fan pressure, and other options. Supercharging fan pressure can be controlled by staging fans, variable-speed drives, variable-pitch blades, and other options. The invention permits the supercharging system to be retrofit on existing turbines without replacing the generator and associated auxiliary equipment. A novel high-pressure duct design (particularly for use between the supercharging fan and the gas turbine) is also disclosed.

51 Claims, 17 Drawing Sheets

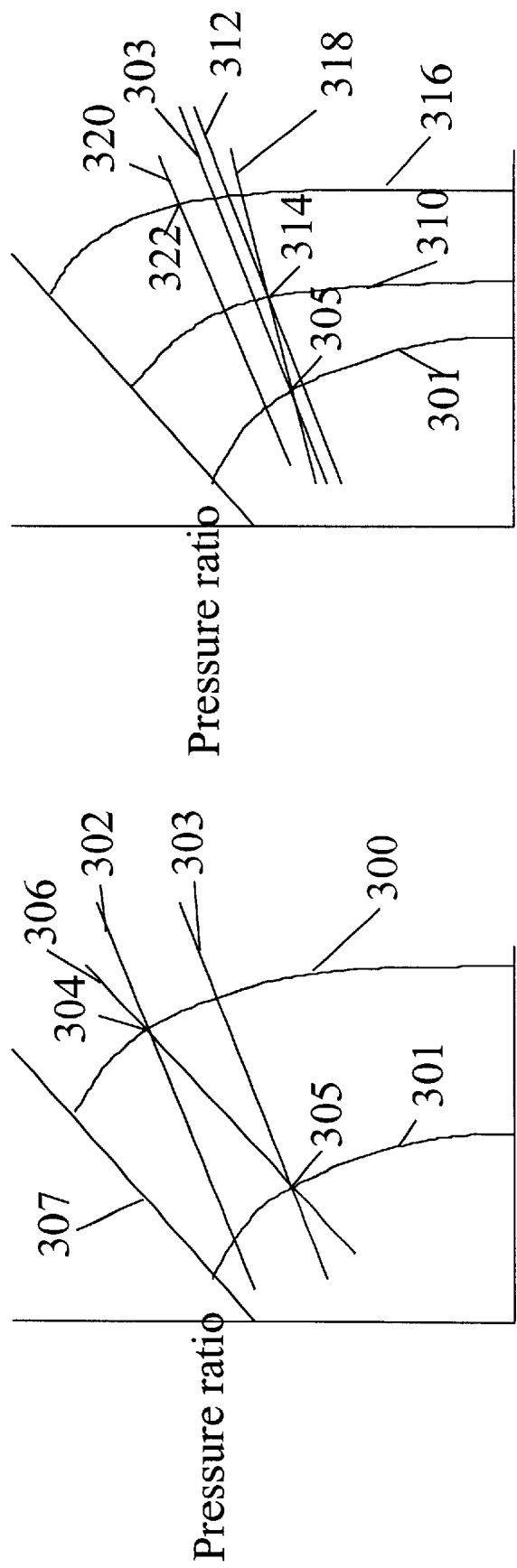

SUPERCHARGING SYSTEM FOR GAS TURBINES

Applicant claims the benefit of co-pending U.S. provisional patent application Ser. No. 60/138,848 filed Jun. 10, 1999; Ser. No. 60/139,894 filed Jun. 22, 1999; Ser. No. 60/152,277 filed Sep. 3, 1999; and Ser. No. 60/159,207 filed Oct. 13, 1999. This application is a continuation-in-part of patent application Ser. No. 09/388,927, filed Sep. 2, 1999, now U.S. Pat. No. 6,308,512.

BACKGROUND OF THE INVENTION

1. Field of the Invention

This invention relates generally to gas turbine power generation systems and more particularly relates to a supercharging system for improving the capacity of gas turbine power plants at high ambient temperatures. Specifically, the system uses a supercharging fan combined with a controller to pressurize inlet air to the turbine to allow operation with existing turbines; the supercharging fan is preferably combined with an inlet air cooling system.

2. Background and Prior Art

It has long been recognized that the capacity of gas turbines declines with increasing inlet air temperature; the typical penalty is on the order of 0.4% per degree F., and this relationship is illustrated in FIG. 1. This characteristic is especially troublesome for gas turbines used in electrical power generation since the peak electricity demand usually coincides with the highest ambient air temperatures. Gas turbines and associated generators and power distribution systems are usually rated based on turbine capacity at 40 to 50° F., inlet air temperature. This low rating temperature means that the capacity reduction at summer-peaking conditions can amount to approximately 20 to 40% of turbine capacity, depending on the design, local weather conditions, and the characteristics of the particular turbine.

Many different approaches for cooling inlet air to the turbine in order to reduce or eliminate this capacity penalty are known in the prior art. A summary of these approaches is described in the ASME paper, "Options in Gas Turbine Power Augmentation Using Inlet Air Chilling," Igor Ondryas et al., presented at the Gas Turbine and Aeroengine Congress and Exposition, June 11–14, 1990, Brussels, Belgium. Among the alternatives for cooling are direct and indirect evaporative cooling, electric vapor-compression, absorption, and thermal storage systems.

Of these many alternatives, direct evaporative cooling is the only approach that has seen any significant commercial application. Direct evaporative cooling has the advantage of low cost and simplicity, but the ambient wet-bulb temperature limits the possible temperature reduction. For locations in the eastern U.S., direct evaporative cooling can reduce inlet air temperatures by 10 to 20° F., depending on the local climate. Larger reductions are possible in warm, dry climates such as those of the southwestern U.S. While direct evaporative cooling is helpful, it does not allow the turbines to run at their full design capacity. After over 50 years of intensive research and development in gas turbines, a better approach for dealing with high ambient temperatures has not been produced.

An interesting but virtually unused approach to address these problems is described in the paper "Supercharging of Gas Turbines by Forced Draft Fans With Evaporative Intercooling" by R.W. Foster-Pegg, ASME 1965. This paper describes the use of a high-pressure fan to increase the inlet pressure to a gas turbine combined with an evaporative cooler downstream of the fan as a way of increasing turbine capacity. This approach could give large theoretical advantages, but it required special sizing of the generator which limited its use to new turbines. In addition, the systems used a single fan with inlet vanes for control purposes, which reduced the efficiency of the system.

Kolp et al. show the economics of the supercharging and cooling systems in the ASME paper "Advantages of Air Conditioning and Supercharging an LM6000 Gas Turbine Inlet," Journal of Engineering for Gas Turbines and Power, July 1995, vol. 117, p. 513–527. This paper shows that while evaporative cooling is extremely attractive, the economics of supercharging are not very attractive, with payback periods of over 10 years for simple cycles. Supercharging is more attractive in combined-cycle plants, but its economics are still marginal. The supercharging systems described in this paper are virtually identical to those from the 1960s, so supercharging has not advanced significantly despite decades of turbine development.

One significant problem in the prior art is that the supercharging arrangements require increasing the size of the associated generator and other auxiliary equipment. The cost of replacing the generator and other auxiliaries is so large that it effectively eliminates this possibility for existing plants. Even in new installations, supercharging may not be a practical option except at the very beginning of the project since the basic requirements of the generator, power distribution system, and associated hardware would have to change. As Kolp et al. state in their paper (page 520), "in contrast to supercharging, it is not necessary to increase the size of gas turbine plant equipment when adding evaporative cooling." Thus the conventional wisdom is that evaporative cooling may be added to an existing power plant, but supercharging is not a retrofit option.

Another method for controlling turbine capacity involves a variable-speed compressor. Relevant patents include U.S. Pat. Nos. 3,853,432 and 2,693,080. These systems would provide a large range of control and usually were intended for use in aircraft applications. A major problem with these systems is the cost and complexity of the variable-speed compressor. Related problems are the reliability and maintenance related to the large gearing required for these systems. These systems have not seen significant use in power-generation applications.

SUMMARY OF THE INVENTION

In accordance with one preferred embodiment of the present invention, a system for improving gas turbine capacity at high ambient air temperatures includes at least one supercharging fan that pressurizes turbine inlet air and a controller which limits maximum turbine capacity to that of the turbine without supercharging. The system preferably includes an air cooler for reducing turbine inlet air temperature. The system of the invention may be added to an existing gas turbine or designed for a new, supercharged, gas turbine system.

One of the principal objectives and advantages of the invention is the ability to increase turbine capacity under summer-peaking conditions while reducing the installed cost of the system based on capacity at summer-peaking conditions. Related objectives of the invention are to create a relatively compact system that is not excessively complex and that does not create unacceptable reliability or maintenance problems. An additional objective is to develop a supercharger that allows practical retrofit of existing turbines.

BRIEF DESCRIPTION OF THE DRAWINGS

FIGS. 7A and 7B are schematic compressor maps that show the principles of operation of the system according to the invention;

DETAILED DESCRIPTION OF PREFERRED EMBODIMENTS

Figure 1:
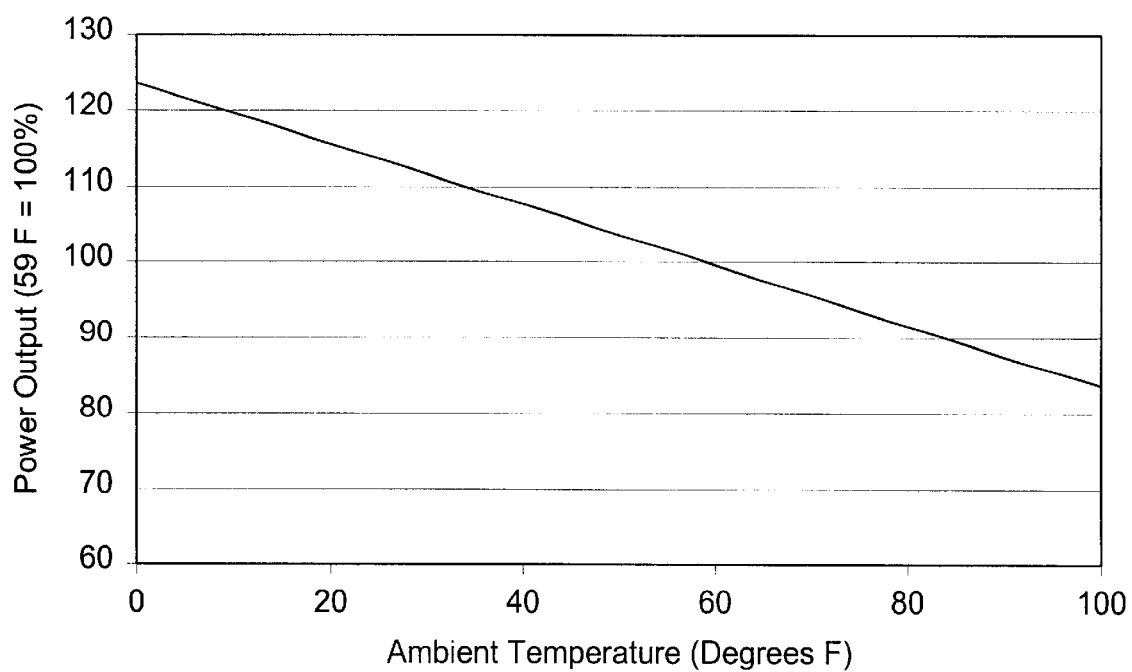
FIG. 1 is a graph illustrating the relationship between turbine capacity and ambient temperature.
Figure 2A:
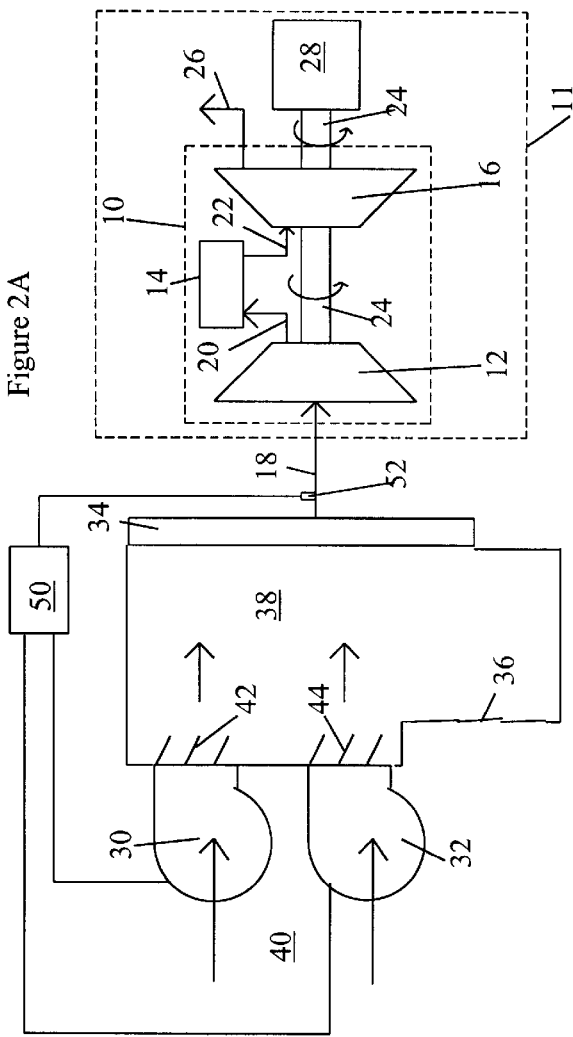
FIGS. 2A–2C are schematic diagrams of one preferred embodiment of the invention that includes an air cooler downstream of a supercharging fan which pressurizes air entering a gas turbine.

FIG. 2A shows a preferred embodiment of the invention. A gas turbine power plant 11 contains a gas turbine system 10 and a generator 28. Gas turbine system 10 includes a compressor 12, a burner 14, and a turbine 16. The turbine 16 shares a common shaft 24 with the compressor 12 and the generator 28. The compressor 12 receives compressor inlet air stream 18 and pumps it to a higher pressure to create pressurized burner inlet air stream 20 which is supplied to burner 14. Burner 14 heats the air from stream 20 and supplies the resulting heated turbine inlet air stream 22 to the turbine 16. Turbine 16 rotates in response to the received heated inlet air stream 22, thereby rotating shaft 24 which in turn rotates generator 28 to generate electric power. Exhaust air stream 26 exits the turbine 16. This exhaust stream 26 may go directly into the atmosphere, or it can enter a steam boiler in the case of a combined cycle plant as described below in connection with FIG. 13.

While FIG. 2A depicts a simple turbine arrangement for the purpose of explaining the invention, it will be recognized that more complicated arrangements (such as a dual-spool configuration) also may be employed and do not change the principle of operation of the invention. Of course, the gas turbine will normally include filters, controls, safety devices, etc. as is known to those skilled in the art, and as such no illustration or detailed explanation of such components is provided or necessary for purposes of explanation of the present invention.

The inlet air stream 18 is provided to the compressor 12 as follows. A first supercharging fan 30 and a second supercharging fan 32 draw ambient air 40 and supply pressurized air to plenum 8. The air then goes through air cooler 34 which cools the air, thereby forming a compressor inlet air stream 18 that enters compressor 12. The air cooler 34 is preferably a direct evaporative cooler that cools and humidifies the air stream. Examples of possible configurations for evaporative coolers are well known in the prior art. Other alternatives for the air cooler include a direct-expansion evaporator, a chilled water coil or direct-contact heat exchanger, an indirect evaporative cooler, or other device for lowering the temperature of the air stream. For the case of a chilled-water coil, cold water can be provided by a vapor-compression chiller, an absorption chiller, or from naturally occurring sources of cold water such as groundwater or bottom water from deep lakes or seas. In the case of an absorption chiller, waste heat from the turbine exhaust may be used as a heat source to drive the chiller. The air cooler is preferably located in the air stream between the supercharging fans and the turbine, but it also could be located upstream of the supercharging fans. The advantage of locating the air cooler downstream of the supercharging fans is that it can remove any heat added by the supercharging fans.

A bypass damper 36 allows air to enter the plenum 38 without going through the supercharging fans when the supercharging fans are not operating. First supercharging fan 30 has a corresponding first damper 42 on its discharge end. Likewise, second supercharging fan 32 has a second damper 44 on its discharge end. The controller 50 receives an input control signal from sensor 52 and controls operation of supercharging fans 30 and 32 in accordance with such signal. Possible control inputs include air stream temperature, compressor outlet pressure, generator output power, and ambient air temperature. The controller can be as simple as a thermostat; alternatively, it may include computer (i.e., microprocessor) control and other associated electronics that also may control and monitor turbine performance.

Figure 2C:
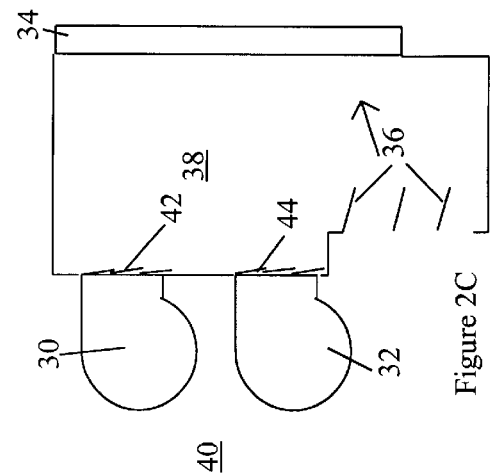
Figure 2B:
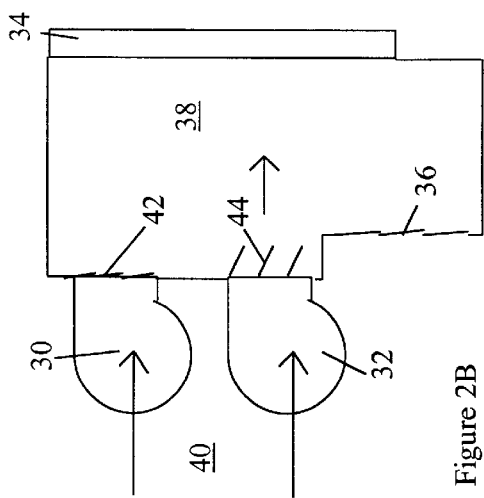

Dampers 42 and 44 and bypass damper 36 act as check valves to prevent reverse air flow from the gas turbine. The dampers preferably open in response to a pressure gradient across the damper, with a gravity return to the closed position in the absence of a pressure gradient. FIGS. 2B and 2C show how the dampers operate in response to different fan operating modes, as explained more fully below.

The first and second supercharging fans 30 and 32 preferably are direct-driven centrifugal fans or axial fans. Belt-driven arrangements are also an option, especially for centrifugal fans. For centrifugal fans, the preferred design uses backwardly inclined airfoil blades to maximize efficiency. Fans of this type can supply a design static pressure of about 60 inches of water, which is approximately the required value for most commercial applications. Electric motors—preferably three-phase induction motors—normally would provide the power to drive the supercharging fans, although engines or mechanical connection to the turbine itself are possible alternatives.

While FIGS. 2A–2C show two supercharging fans, three or more supercharging fans can be used, or even a single supercharging fan may be used. Multiple supercharging fans allow for staging of fans to adjust turbine inlet pressure in increments, whereas a single supercharging fan does not provide this control option.

Preferably, the two supercharging fans have approximately equal pressure capability but are of unequal flow sizing. The lead supercharging fan has a larger flow capacity and preferably operates at a fixed speed to reduce cost. The lag supercharging fan has variable flow capacity and adjusts turbine inlet pressure as is described more fully below. Variable-speed drives or, in the case of axial fans, variable-pitch blades are preferred means for adjusting supercharging fan flow. Inlet vanes are another alternative, but not preferred because of their relatively poor efficiency.

Figure 3:
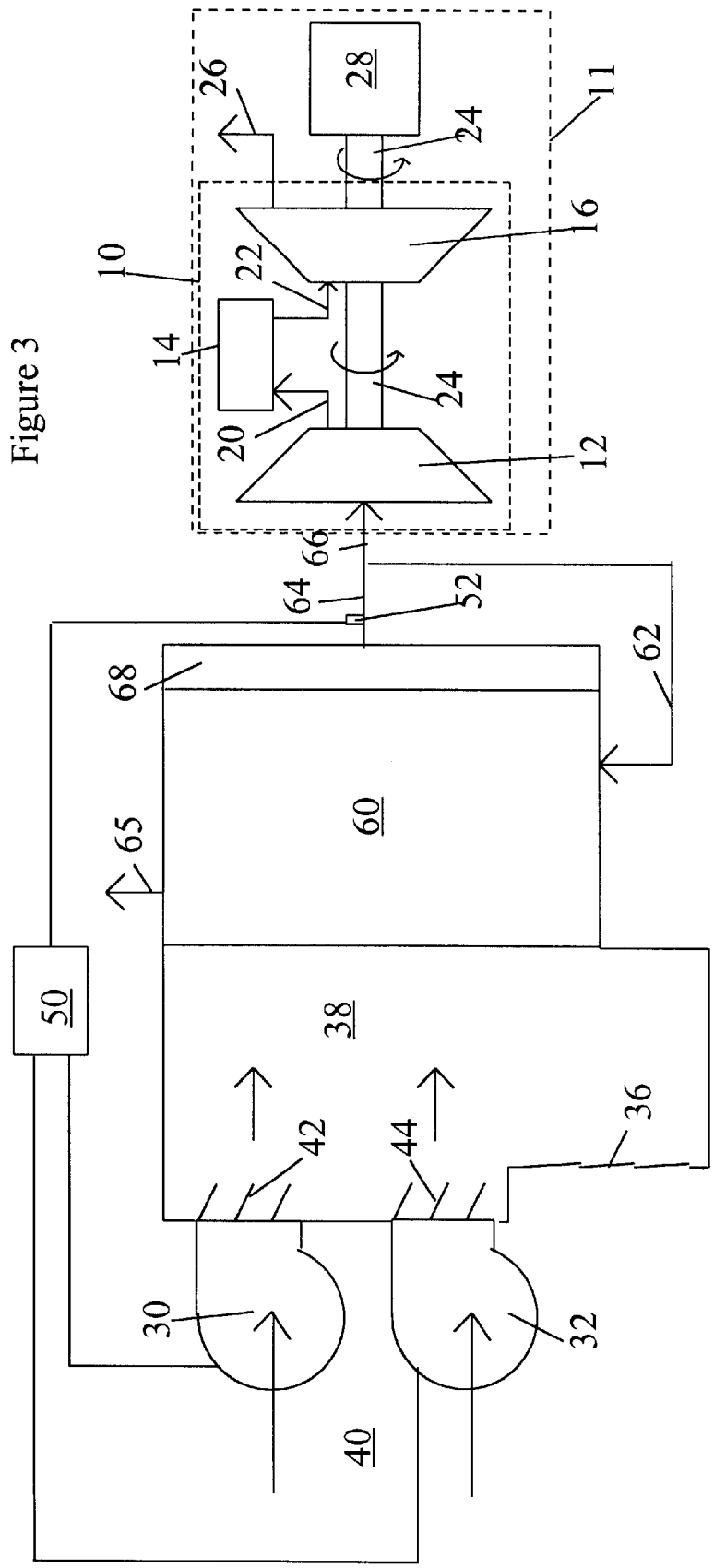
FIG. 3 shows another preferred embodiment of the invention that uses an indirect evaporative cooler.

FIG. 3 shows an alternate embodiment that uses an indirect evaporative cooler that can approach the ambient dewpoint temperature. The configuration is similar to that of FIG. 2 except that an indirect evaporative cooler 60 is located in the air stream between the plenum 38 and the gas turbine 10. As with the previous embodiment, the gas turbine system 10 and generator 28 form a gas turbine power plant 11. Likewise, the gas turbine system 10 includes a compressor 12, a burner 14, and a turbine 16. The indirect evaporative cooler 60 uses a secondary air stream 62, which is taken from a portion of the primary air stream 64 that exits from an optional direct evaporative cooler 68 located between the indirect evaporative cooler 60 and the turbine 10 to optionally further cool the air entering the turbine. A turbine inlet air stream 66 is formed by the remaining portion of the primary air stream 64 and enters turbine 10. The air from the secondary air stream 62 is indirectly heated and humidified by the air flow from plenum 38 inside the indirect evaporative cooler 60 and exits as exhaust air stream 65.

Figure 4:
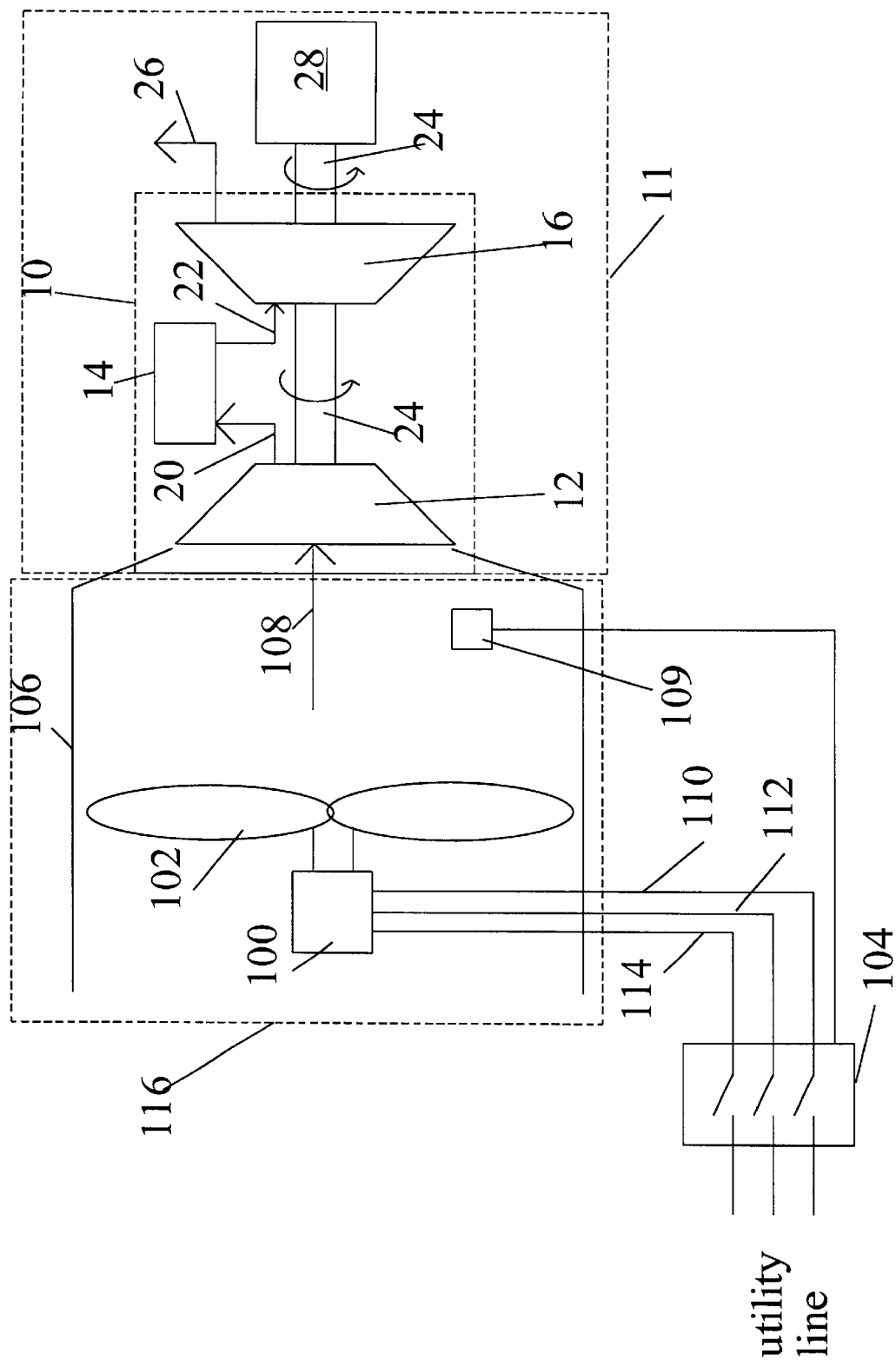
FIG. 4 shows an alternate embodiment of the invention that uses an axial-flow fan.

FIG. 4 shows another alternate embodiment that uses a motor-driven axial-flow supercharging fan. Supercharging fan 116 includes a motor 100 that drives impeller 102, both of which are contained in housing 106. The motor 100 is preferably a three-phase induction motor and is connected to a utility power line by conductors 110, 112, and 114 through switching contactor 104. When the contactor 104 closes, the motor 100 is energized, thereby driving impeller 102 which increases the pressure of discharge air stream 108 entering the turbine system 10. When the contactor 104 is open, the motor 100 is de-energized and the impeller 102 is driven solely by the air stream 108, thus acting as a pressure reducer which reduces the pressure of air stream 108.

The contactor 104 may be a simple, manually operated device, in which case an operator will determine when extra turbine capacity is appropriate and close the switch to operate the supercharging fan. The preferred arrangement includes a thermostat 109—preferably located in contact with the air stream 108—which controls the contactor 104 and allows the supercharging fan 116 to operate when the temperature of the air stream 108 exceeds a predetermined value. Thermostat 109 thus functions to limit turbine output power and therefore prevents overloading of the gas turbine power plant 11.

More sophisticated controls are possible. For example, the supercharging fan can have variable-pitch blades, which are adjusted by a controller that senses pressure and temperature conditions and varies the pitch of the blades to maximize turbine output. Very sophisticated control is currently possible with microprocessor-based systems. Additional mechanical hardware can be added to improve performance. For example, a bypass damper can reduce the pressure drop through the supercharging fan when it is not energized. A direct evaporative cooler or other cooling means could be added to reduce turbine inlet temperatures.

One advantage of the system shown in FIG. 4 is its low cost and simplicity, which are especially important in small turbines. The optimum configuration requires careful evaluation of the commercial application. While not preferred, the switch 104 may be eliminated in special applications. For example, if a turbine is moved from a cold climate to a tropical climate, it may be desirable to add a supercharging fan that runs continuously whenever the turbine is running. (Essentially, the supercharging fan would adjust the design conditions of the turbine to match the higher ambient temperatures.) Another, less preferred option would be to drive the supercharging fan directly from the turbine. The simplest configuration would be a direct mechanical connection using a shaft that is attached to the turbine. However, normally this arrangement would require a reduction gear to allow the supercharging fan to run at a speed that is much slower than that of the turbine. An eddy current clutch or mechanical clutch could be used to allow changes in fan speed. Another option would be to use a differential gearing to a brake, a generator, or other reactor to reduce the speed of the fan by controlling the speed of a second shaft. These arrangements would be difficult (or perhaps impossible) to retrofit onto existing turbines, and the gearing and other mechanical components necessary for this approach would require regular maintenance. Accordingly, this alternate embodiment may not be as reliable or desirable as others.

Figure 5:
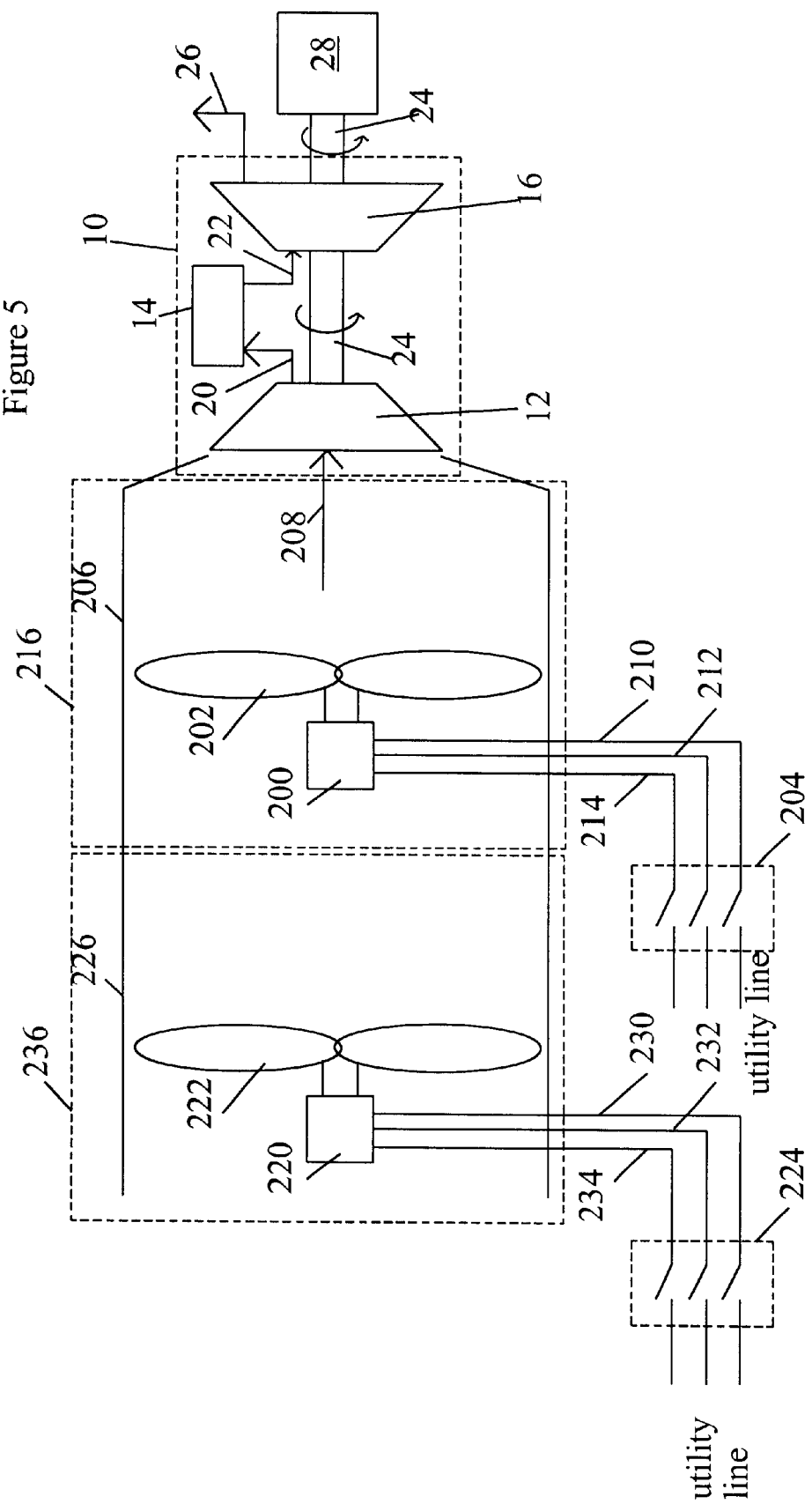
FIG. 5 shows another alternate embodiment of the invention that uses series fans.

FIG. 5 shows another alternate embodiment, this one having two supercharging fans arranged in series. A first supercharging fan 216 includes a first impeller 202 and a first motor 200 in a first housing 206. The first fan is located in an inlet air stream 208 which enters compressor 12. Conductors 210, 212, and 214 connect the first motor 200 through switch 204 to the utility power line. A second fan 236 is located upstream of the first fan 216. The second fan comprises a second impeller 222 and a second motor 220 in a second housing 226. The second motor 220 is connected through switch 224 and conductors 230, 232, and 234 to a utility power line.

Operation and benefits of the system of the invention will now be described in the context of FIGS. 2A, 2B, and 2C, which show a system that operates with two supercharging fans arranged in parallel. In FIG. 2A, both the first and second supercharging fans 30 and 32 are operating, and the bypass damper 36 is closed to prevent backward flow away from the turbine. First and second damper 42 and 44 are both open to allow air flow from the fans.

FIG. 2B shows operation with the first supercharging fan 30 off and the second supercharging fan 32 on. The bypass damper 36 is again closed. The second damper 44 remains open, while the first damper 42 is closed. In FIG. 2C, both supercharging fans 30 and 32 are off and their corresponding dampers 42 and 44 are closed. The bypass damper 36 is open to allow air to go around the supercharging fans 30 and 32.

Figure 6:
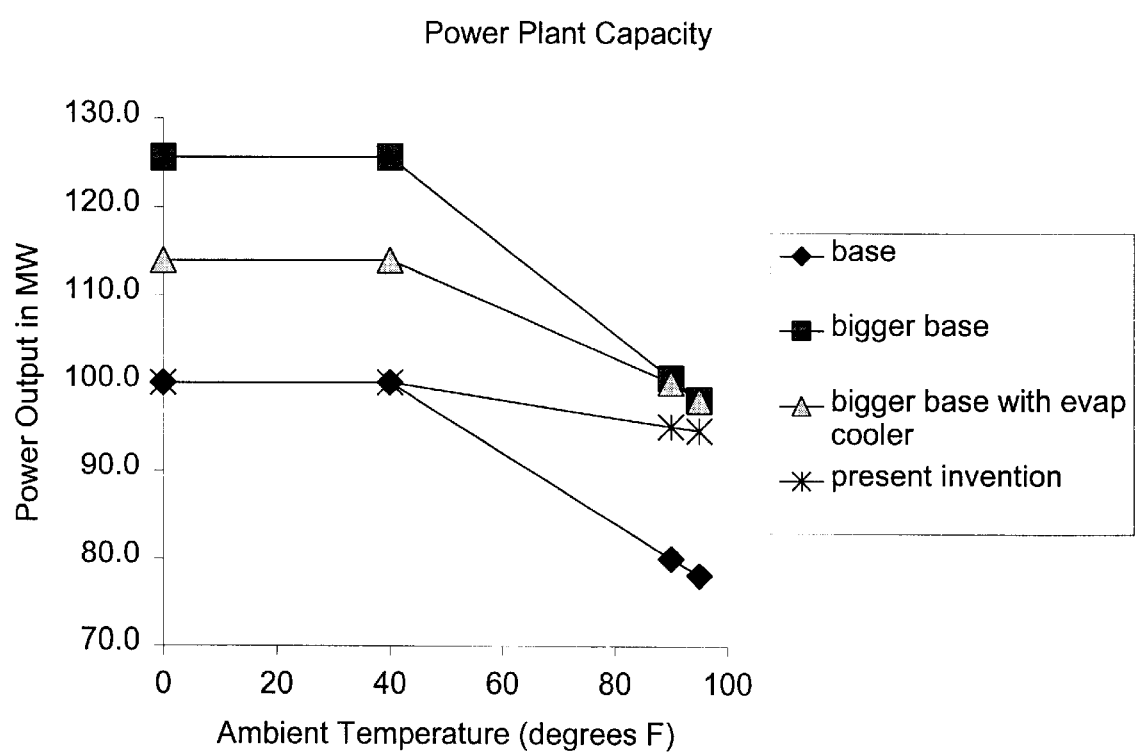
FIG. 6 is a graph comparing the temperature-variant turbine capacity of several different turbine systems.

FIG. 6 illustrates the benefits of such a system. This figure is based on published performance data for gas turbines. The base system without any supercharging or inlet cooling has a peak power output around an ambient temperature of 40° F., and performance drops rapidly at higher temperatures. The figure shows that the capacity of the present invention is essentially flat, while the capacity for conventional systems drops rapidly at high ambient air temperatures. The base system is a simple-cycle turbine that gives a maximum output power of 100 MW below 40° F., but much lower capacity at higher ambient temperatures. The present invention also has the same 100 MW capacity but maintains it at high ambient temperatures.

The bigger base and bigger base with evaporative cooler are simple-cycle turbines designed to match the present invention at high ambient temperatures. The bigger base also can be a supercharged turbine from the prior art. The bigger base with evaporative cooler takes advantage of the lower inlet temperatures available with evaporative cooling to reduce the size requirements of the turbine for a given capacity at high ambient temperatures. The performance of the bigger base with evaporative cooling is also similar to that of supercharged turbines from the prior art.

Conventional evaporative inlet cooling helps the performance of the turbine at higher ambient temperatures without increasing the maximum output power at 40° F. A conventional supercharger, which includes an evaporative cooler, further increases turbine output power at all ambient temperatures, which would undesirably overload the gas turbine power plant at lower ambient temperatures.

The present invention limits turbine output to allow the benefits of supercharging at high ambient temperatures while preventing overloading of the power plant at low ambient temperatures. This new feature results in a power output that varies very little with ambient temperature changes.

Table 1 shows a cost comparison (adapted from Kolp et al.) for the supercharger of the present invention compared to conventional systems. This table shows that adding the new supercharger is less than half of the cost of adding peaking turbine capacity. The incremental cost per kW for adding the supercharger to a system with an evaporative cooler is about $300 per kW, whereas the cost of a new peaking turbine power plant is $700 per kW. The combination of an evaporative cooler and the supercharger increases turbine capacity at summer-peaking conditions by over 30%. The controls in the present invention eliminate the need for the bigger generator and related hardware, since the peak power output of the turbine at low ambient temperatures is unchanged. This analysis shows that the present invention has a significant advantage in new installations. In retrofit situations, the cost of adding a conventional supercharger would be at least an order of magnitude larger since it would require replacement of the generator and related equipment in order to handle the increased output at low-ambient-temperature conditions.

TABLE 1

Cost comparison

|  | Incremental Cost | kW at Peak | Incremental Peak kW | Incremental Cost per kW |
| --- | --- | --- | --- | --- |
| Peaking Turbine: |  |  |  |  |
| Base | $21,260,400 | 30,372 | 30,372 | $700 |
| plus evaporative cooler | $220,000 | 36,180 | 5,808 | $38 |
| plus supercharger | $1,386,000 | 40,749 | 4,569 | $303 |
| plus bigger generator, etc. | $580,550 | 40,749 | 0 | infinite |

TABLE 1-continued

Cost comparison

|  | Incremental Cost | kW at Peak | Incremental Peak kW | Incremental Cost per kW |
| --- | --- | --- | --- | --- |
| Combined Cycle Plant: |  |  |  |  |
| Base | $38,885,000 | 38,885 | 38,885 | $1,000 |
| plus evaporative cooler | $220,000 | 47,415 | 8,530 | $26 |
| plus supercharger | $1,386,000 | 53,183 | 5,768 | $240 |
| plus bigger generator, etc. | $1,796,238 | 53,183 | 0 | infinite |

Table 2 shows how adding a supercharging fan can improve power plant performance. For the example in the table, a supercharging fan would increase the turbine output by just over 4 MW while consuming only 1.24 MW of power. The result is an increase in net power output of almost 2.8 MW. This simple analysis shows that a supercharging fan can significantly improve peak power output for gas turbines.

TABLE 2

Power Comparison for a 100-MW plant

|  | Base | Cooler Only | Aux. Fan Only | Aux. Fan and Cooler |
| --- | --- | --- | --- | --- |
| Inlet static pressure change (inches of water) | 0 | −0.5 | 10 | 9.5 |
| Inlet temp. ° F. | 95 | 77 | 99.9 | 78.7 |
| Temperature change effect on turbine output (MW) | 0 | 7.20 | −1.96 | 6.5 |
| Static pressure effect on turbine output | 0 | −0.30 | 6.00 | 5.70 |
| Aux. Fan Power (MW) | 0 | 0.00 | −1.24 | −1.24 |
| Net change in turbine power output (MW) | 0 | 6.90 | 2.80 | 10.96 |

(Assumptions: 8 CFM/kW, 95° F. DB, 75° F. WB, 80% fan efficiency, 95% efficient fan motor, 0.4% change in kW/(F, 0.6% change in kW/inch $H_2O$, 90% cooler effectiveness.)

This table also shows that, in combination, a supercharging fan and an evaporative cooler work synergistically to increase turbine power output. As stated before, adding the supercharging fan to the turbine without a cooling mechanism would increase power output by 2.80 MW. On the other hand, adding the same fan to a turbine with a direct evaporative cooler adds 4.06 MW of capacity. The effect of the supercharging fan is thus almost 50% greater with the cooler than without the cooler. This analysis shows that the effect of the combination is greater than the sum of the parts and thus is especially desirable.

Table 2 shows that a significant improvement is possible with a supercharging fan with only 10 inches of static pressure. Additional improvement is possible for supercharging fans with higher static pressures. In many installations the optimum supercharging pressure may exceed 60 inches of static pressure.

FIGS. 7A and 7B are compressor maps illustrating the improvement in turbine capacity which can be obtained with the present invention. The vertical axis is turbine pressure ratio, which is the turbine inlet pressure divided by the atmospheric pressure. The horizontal axis is the mass flow parameter, which is given by the equation:

$$\text{mass flow parameter} = \frac{m\sqrt{\theta}}{\delta},$$

where:
  m is the turbine mass flow rate,
  $\delta$ is the compressor inlet pressure divided by the standard atmospheric pressure, and
  $\theta$ is the compressor inlet absolute temperature divided by design absolute temperature.

The pressure ratio is the compressor discharge pressure divided by the atmospheric pressure. For purposes of this analysis, the effect of burner pressure drop and other minor factors are lumped with the compressor and turbine performance. (For background information in component matching, see Blathe, *Fundamentals of Gas Turbines*, chapter 10.)

Compressor curve 300 shows the performance of the compressor at design conditions, while compressor curve 301 shows the performance at peak inlet temperature. Turbine line 302 shows the performance of the turbine at design conditions, and turbine line 303 represents the turbine performance at peak inlet temperature. The intersection of compressor curve 300 and turbine line 302 defines the design operating point 304. The intersection of the compressor curve 301 and turbine line 303 is operating point 305 at the peak inlet temperature. The operating line 306 shows possible turbine operating points at different inlet temperatures. Surge line 307 is the limit of stable operation for the compressor.

At operating point 305, the turbine capacity is significantly reduced from that at the design operating point 304. The higher inlet temperature increases the speed of sound of the air, which reduces the compressor Mach number and moves the compressor curve to the left as shown in the figure. In addition, the higher temperature reduces air density which further reduces mass flow rate. These changes reduce the compressor pressure ratio and mass flow rate, which reduces the energy available for driving the turbine. Cooling the air can restore the turbine capacity.

FIG. 7B illustrates how the new system can improve turbine capacity at peak ambient temperatures. Pressurizing the air entering the compressor increases the turbine pressure ratio and compressor inlet temperature to create a compressor curve 310. A new turbine line 312 reflects the slightly higher temperature. The intersection of the turbine line 312 and the compressor curve 310 defines an operating point 314. This operating point corresponds to the operation with a supercharging fan and no inlet cooling.

Operating line 318 shows possible operating conditions with different operating pressures. An additional benefit of higher pressure air is increased air density, which further enhances the capacity improvement.

Another compressor curve 316 and a turbine line 320 correspond to a lower compressor inlet temperature that can be achieved using an evaporative cooler. An operating point 322 at the intersection of the compressor curve 316 and turbine line 320 corresponds to an operating condition for a supercharging fan and inlet cooling. This analysis indicates that it is possible to approximate the original design capacity of a gas turbine through a combination of inlet cooling and pressurization. The ultimate limits of the turbine capacity are the operating pressures and power output that are acceptable for the turbine, generator, etc. These factors would normally prevent the supercharging fan and inlet cooling from creating a turbine output that is significantly above the turbine design output.

Figure 8B:
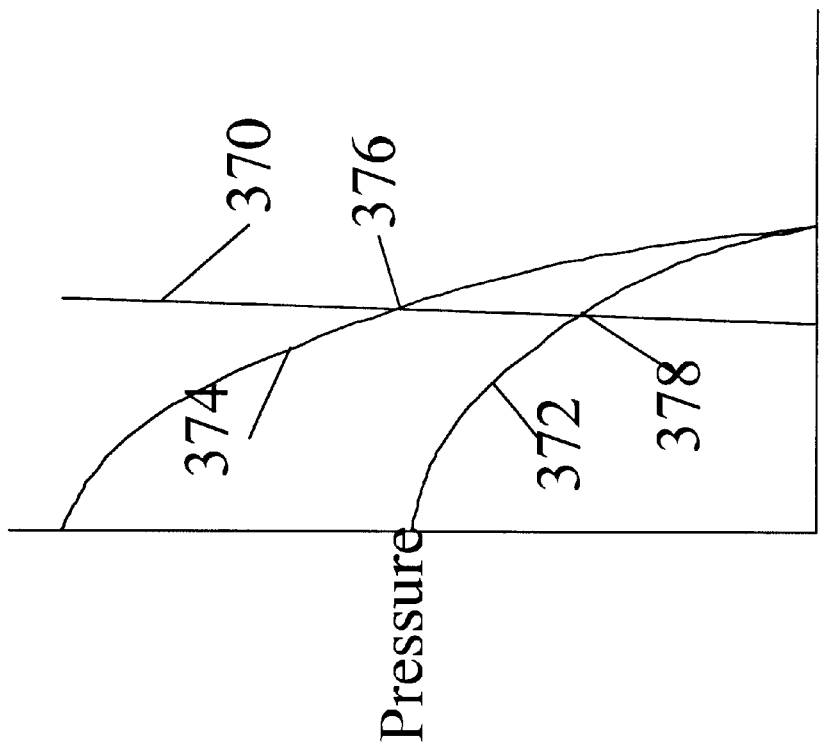
FIGS. 8A and 8B are fan curves that show how multiple fans can be used to vary inlet pressure to a gas turbine.
Figure 8A:
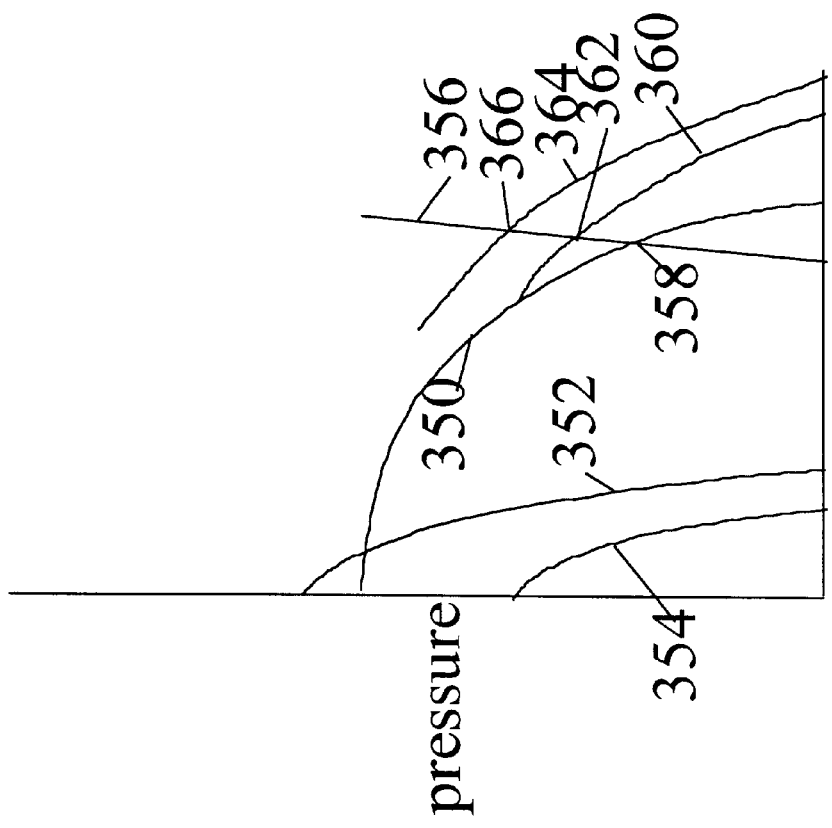

FIG. 8A plots fan curves showing how parallel supercharging fans can work together to create a range of turbine inlet pressures. For parallel operation, the pressure across the two fans is the same and the flows add together. A lead fan curve 350 is for the lead fan. The gas turbine line 356 is nearly vertical since the flow through the turbine varies only slightly with inlet pressure. The operating point 358 is at the intersection of the lead fan curve 350 and the turbine line 356. This operating point 358 corresponds to operation with one fan.

A first lag fan curve 352 corresponds to the performance of the lag fan at full speed. Fan curve 364 corresponds to running both fans together. The intersection of the fan curve 364 and the turbine line is an operating point 366 that corresponds to operation with both fans. A second lag fan curve 354 represents fan performance at low speed, and fan curve 360 represents the corresponding two fan operation. An operating point 362 represents the operating condition with both fans operating and the lag fan at low speed.

FIG. 8B illustrates operation with two similar fans in series. Fan curve 372 corresponds to operation with only one fan. The intersection of the fan curve and the turbine line 370 represents operation point 378 for one fan. Fan curve 374 corresponds to both fans running. Operating point 376 represents turbine operation with both fans running.

Figure 9:
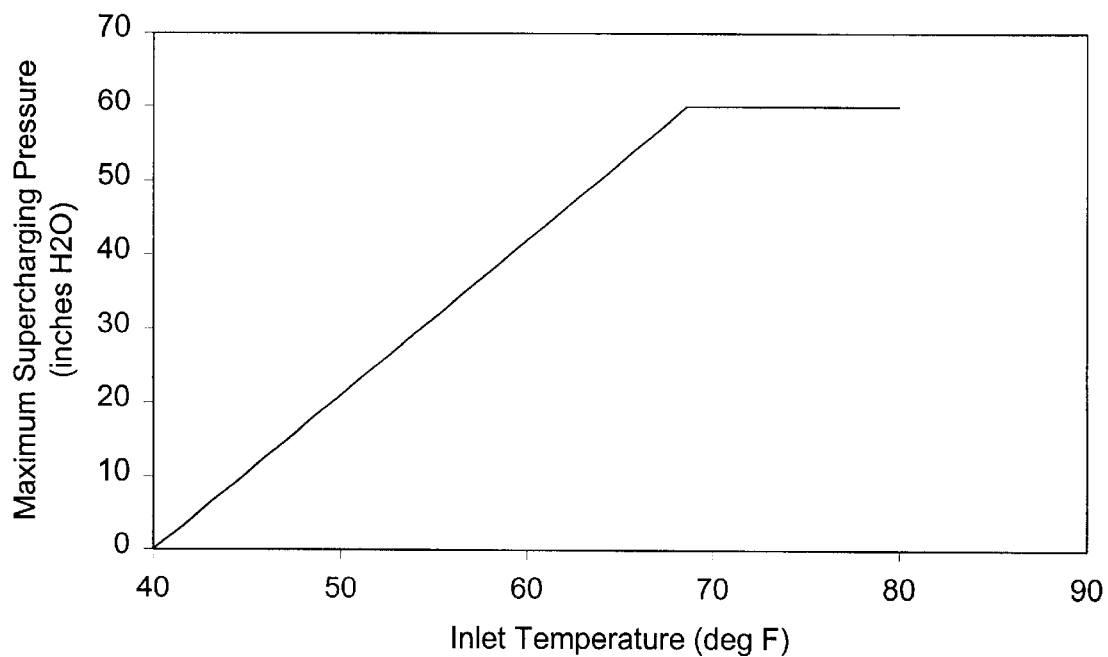
FIG. 9 is a graph of maximum supercharging pressure as a function of turbine inlet air temperature.

FIG. 9 shows a simple relation between maximum supercharging pressure and inlet temperature that may be used to control the supercharger. The controller can use the temperature entering the compressor to adjust the supercharger pressure. The result is a very simple control system for maximizing turbine performance. This approach may be very useful in controlling a supercharger in retrofit situations since it would require little or no changes to existing controls for the gas turbine power plant.

Figure 10:
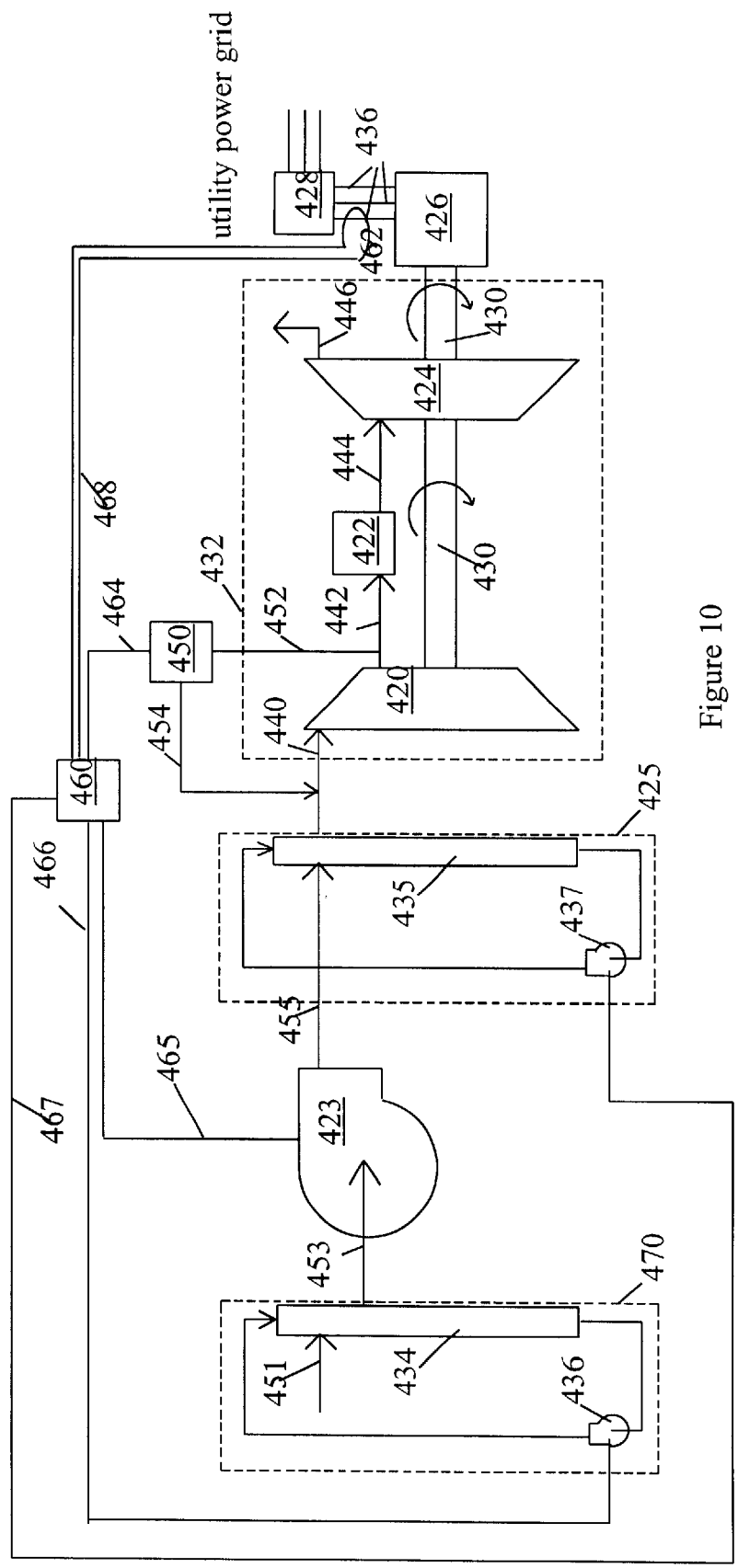
FIG. 10 shows an alternate embodiment of the invention in which heated compressor output air is fed back into the compressor inlet air stream to regulate gas turbine performance.

More sophisticated control and operation are also within the scope of the invention. For example, another preferred embodiment having a recirculation arrangement around the compressor to control capacity of a gas turbine power plant 421 is shown in FIG. 10. The gas turbine power plant comprises a gas turbine system 432 and a generator 426. The gas turbine system 432 includes burner 422, compressor 420, and turbine 424, the latter two of which share a common shaft 430. Compressor inlet air stream 440 enters the compressor 420 and is compressed to form burner inlet air stream 442. The burner 422 heats the air stream 442 to form burner outlet air stream/turbine inlet air stream 444 that enters turbine 424. The turbine 424 extracts power from the air stream, which exits as exhaust 446. The gas turbine power plant also includes structure, bearings, controls, and other components which are known in the art and therefore not shown. The gas turbine power plant also may include a bottoming steam cycle system or multiple shaft arrangements.

The turbine 424 drives the compressor 420 and generator 426, which also shares the shaft 430. The generator supplies electric power to the utility grid through conductors 436 and a transformer 428.

Supercharging fan 423 pressurizes fan inlet air stream 453 to form a pressurized air stream 455 that enters a first evaporative cooler 425. The first evaporative cooler 425 includes a pump 437 and an evaporative pad 435. The first evaporative cooler 425 cools the pressurized air stream 455 to form compressor inlet air stream 440.

The supercharging fan supplies a static pressure on the order of 60 inches of water and preferably may be a centrifugal fan or an axial fan. The pressurized air stream 455 and the compressor inlet air stream 440 are confined in ducts that can handle this high pressure; preferred duct configurations are described below in connection with FIGS. 15, 16A, 16B, 17A, and 17B.

A second evaporative cooler 470 is provided upstream of the supercharging fan 423. The evaporative cooler includes an evaporative pad 434 and a pump 436 which circulates water over the pad to create a wet surface for cooling the ambient air stream 451 by means of evaporation before it is supplied to supercharging fan 423 as fan inlet air stream 453. The evaporative coolers each also may include a sump with a float valve to control water level and a means for bleeding off a small portion of the circulated water to prevent build-up of salts.

Numerous evaporative coolers are available commercially from a variety of manufacturers, so details of the cooler design are not included. Additionally, while direct evaporative coolers are illustrated, indirect evaporative coolers or indirect-direct evaporative coolers also may be employed.

A key feature of the present invention is the relative sizing of the supercharged gas turbine and the generator and associated equipment. In particular, the generator and the supercharged turbine are sized so that the generator operates at nearly full capacity at summer-peaking conditions. (In contrast, according to the prior art designs, the generator and auxiliaries would be sized based on full supercharged output at winter conditions, which would typically be inlet temperatures of 40° F. or lower, and performance would "fall of" from these as ambient temperatures increased.) Accordingly, the present invention includes means for controlling turbine capacity at low ambient temperatures so as to prevent overloading the generator.

Preferably, a controller 460 receives a current signal 468 from a current sensor 462 that senses generator current. The controller 460 preferably includes the normal capacity and safety functions of the gas turbine power plant, but it may alternately be a stand-alone unit. The current sensor is preferably a current transformer, in which case the signal is in the form of an AC current. Other possible sensors may be such as to provide a voltage, optical, or radio frequency output signal or some other type of signal.

The controller 460 provides a damper control signal 464 to damper 450 to control the flow of a heated air stream 452, which is drawn from the burner inlet air stream 442 and circulates through the damper 450 to the compressor inlet. The controller 460 also provides pump control signals 466 and 467 to pumps 436 and 437, respectively, and a fan control signal 465 to the supercharging fan 423. Pump and fan control for this embodiment may be as simple as on/off control, although variable control with variable-speed drives, inlet vanes, or variable-pitched blades also might be employed.

Because the system is sized to provide maximum turbine/ generator performance at summer-peaking temperatures, as ambient temperature drops and the turbine output increases, generator output will start to rise and exceed the maximum design output. Therefore, as the ambient air temperature drops, the current sensor 462 senses a correspondingly higher generator current signal 468 and communicates this to the controller 460. The controller responds first by turning off the pump 436 thereby deactivating the second evaporative cooler 470 and allowing the fan inlet air stream 453 to approach the ambient dry-bulb temperature. If the ambient temperature drops further, the preferred control response is to start to open the damper 450 to allow heated air 452 to flow from the compressor outlet to mix with the compressor inlet air stream 440. As ambient air temperature drops even further, the damper will open even further so as to limit the generator current to that produced at summer-peaking performance.

If the ambient temperature drops even further, the controller 460 sends a fan control signal 465 and a pump control signal 467 to turn off the supercharging fan 423 and the pump 437 for the first evaporative cooler 425; these signals terminate supercharging entirely. The controller 460 may then send a damper control signal 464 to close the damper 450.

Figure 11:
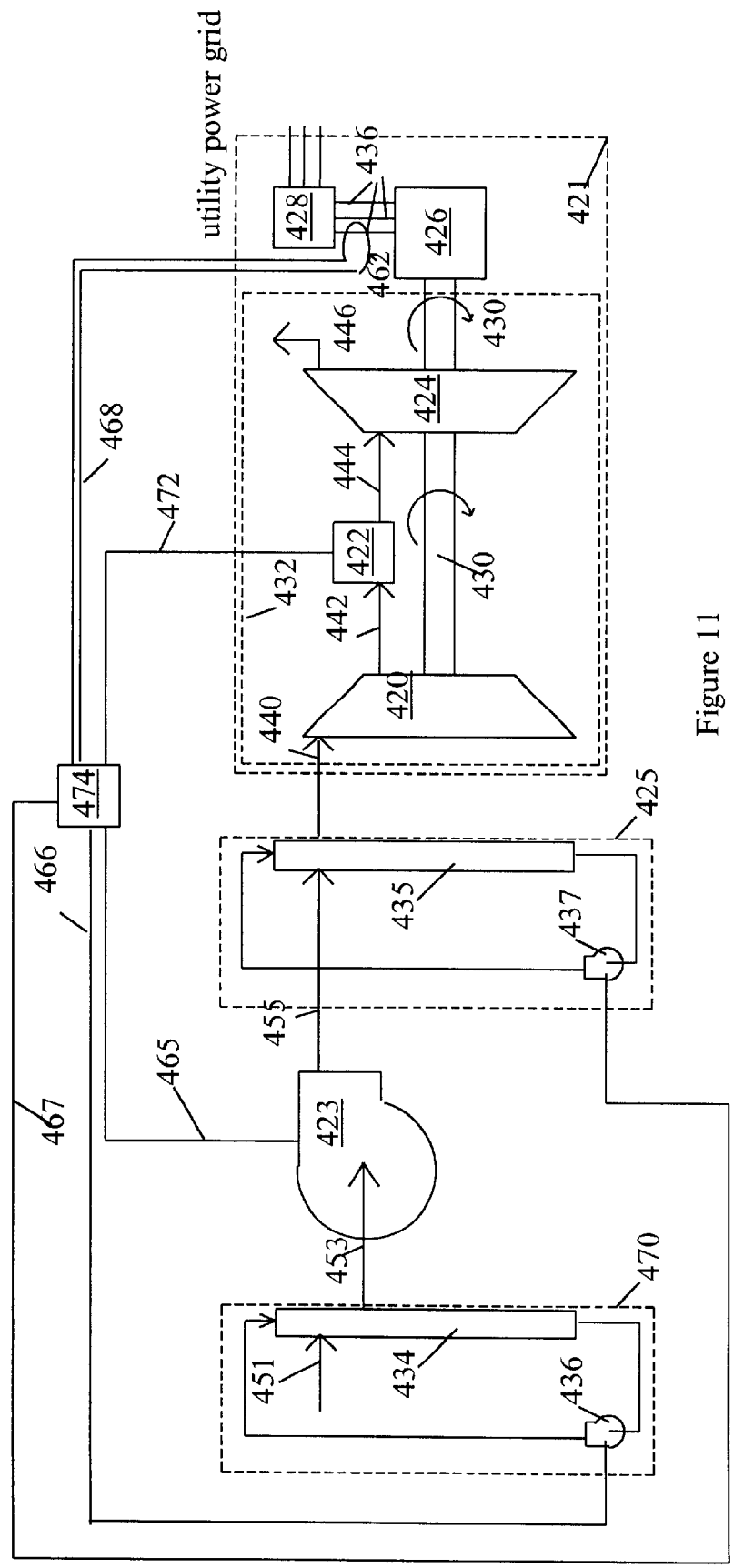
FIG. 11 shows an alternate embodiment of the invention in which turbine output is controlled by regulating burner output.

Another preferred alternate embodiment of a turbine system according to the invention is shown in FIG. 11. Similar to the embodiment shown in FIG. 10, a controller 474 receives a current signal 468 from a current sensor 462 that senses generator current, and the controller 474 provides a pump control signal 466 to pump 436 in response thereto. Rather than regulating a damper to provide heated compressor output air back into the compressor inlet, however, the controller 474 also provides a burner control signal 472 to the burner 422, which regulates the burner output and hence turbine output. Preferably, the normal operating and safety controls for the gas turbine power plant are integrated into the controller 474, but the controller also can be a stand-alone controller.

The control approach used with the embodiment shown in FIG. 11 is similar to that used with the embodiment shown in FIG. 10. As the ambient temperature drops and causes a resultant increase in output generator current, controller 474 responds by turning off pump 436 to deactivate the second evaporative cooler 470. If the generator current still exceeds the summer-peaking design output, the controller 474 responds by adjusting the burner control signal 472 to reduce the output of burner 422. At still lower ambient temperatures, the controller will turn off the supercharging fan 423 and the first evaporative cooler 425 altogether so that the power plant operates without any supercharging at all.

Figure 12:
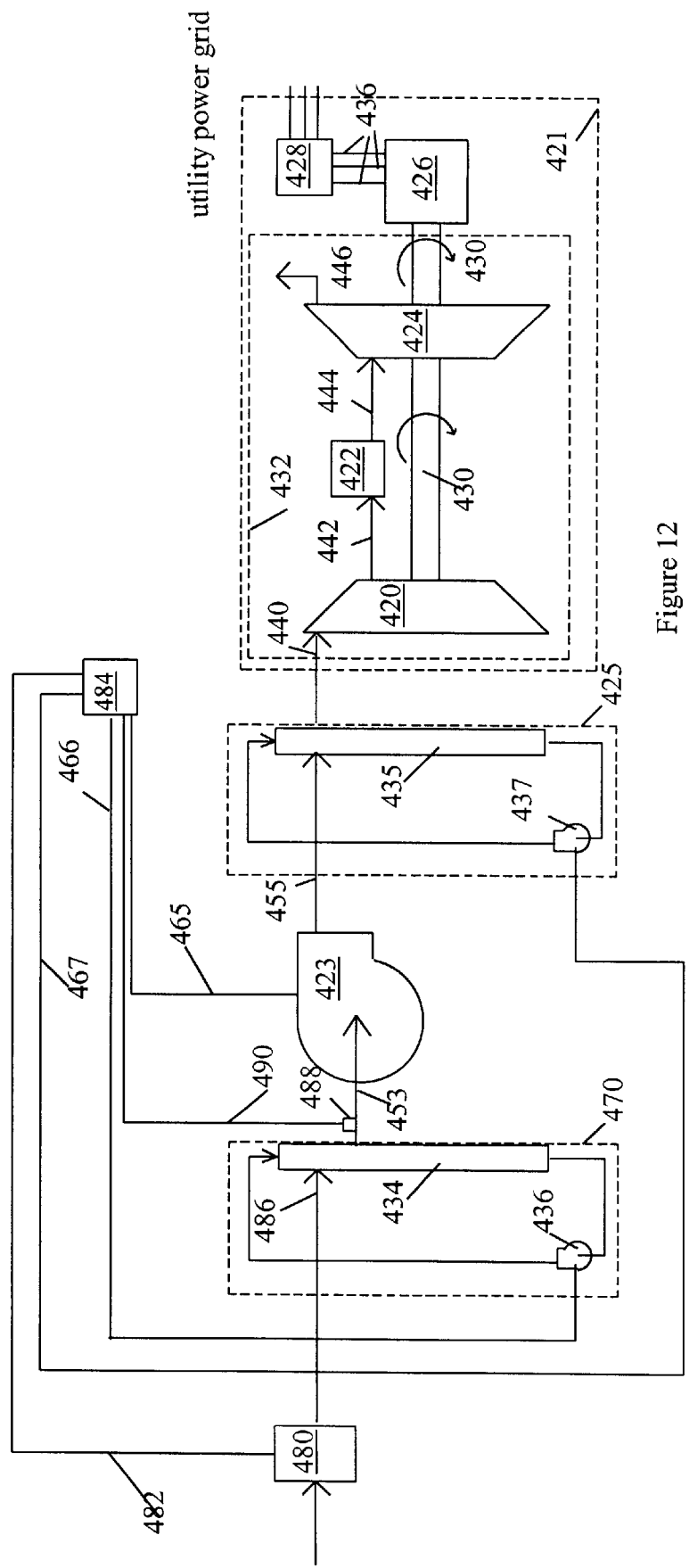
FIG. 12 shows an alternate embodiment of the invention in which turbine output is controlled by regulating compressor inlet temperature.

FIG. 12 shows another alternate embodiment of the invention in which turbine output is controlled by regulating compressor inlet temperature using a heater. Controller 484 receives a temperature signal 490 from a temperature sensor 488 that is located in the compressor inlet air stream 440 The controller 484 provides a heater control signal 482 to a heater 480 located upstream of the compressor inlet, and the heater provides a heated air stream 486 to the compressor 420. (While the preferred location for the heater is upstream of the evaporative cooler, the heater alternatively may be located between the evaporative cooler 470 and the compressor 420 if the heater is made of materials that can handle high relative humidity without excessive corrosion.)

There are a number of options for implementing the heater. One simple option is to use a gas burner. A second option is to use a boiler with a separate liquid-to-air heat exchanger. A third option is to use a heat exchanger that recovers heat from the turbine exhaust 446. (This option should provide the best efficiency and therefore is preferred if installed cost is not excessive.) Electric heaters are a fourth option, although they are not preferred because of their poor efficiency. Finally, blowing a portion of the exhaust 446 into the compressor inlet air stream 440 is a low-cost fifth option, but that may cause corrosion problems in the compressor 420 or other components. Regardless of the specific type, the heater should be capable of modulating its output so as to maintain the heated air stream 486 at an approximately constant temperature.

The control approach utilized with the embodiment shown in FIG. 12 is to maintain a minimum temperature of the supercharging fan inlet air stream 453. Therefore, as the ambient air temperature drops, the controller 484 responds by turning off the pump 436 to deactivate the evaporative cooler 470. If the ambient temperature drops further, the controller 484 provides a heater control signal 482 to turn on heater 480 and adjust its output to maintain the required temperature of the fan inlet air stream 453.

Figure 13:
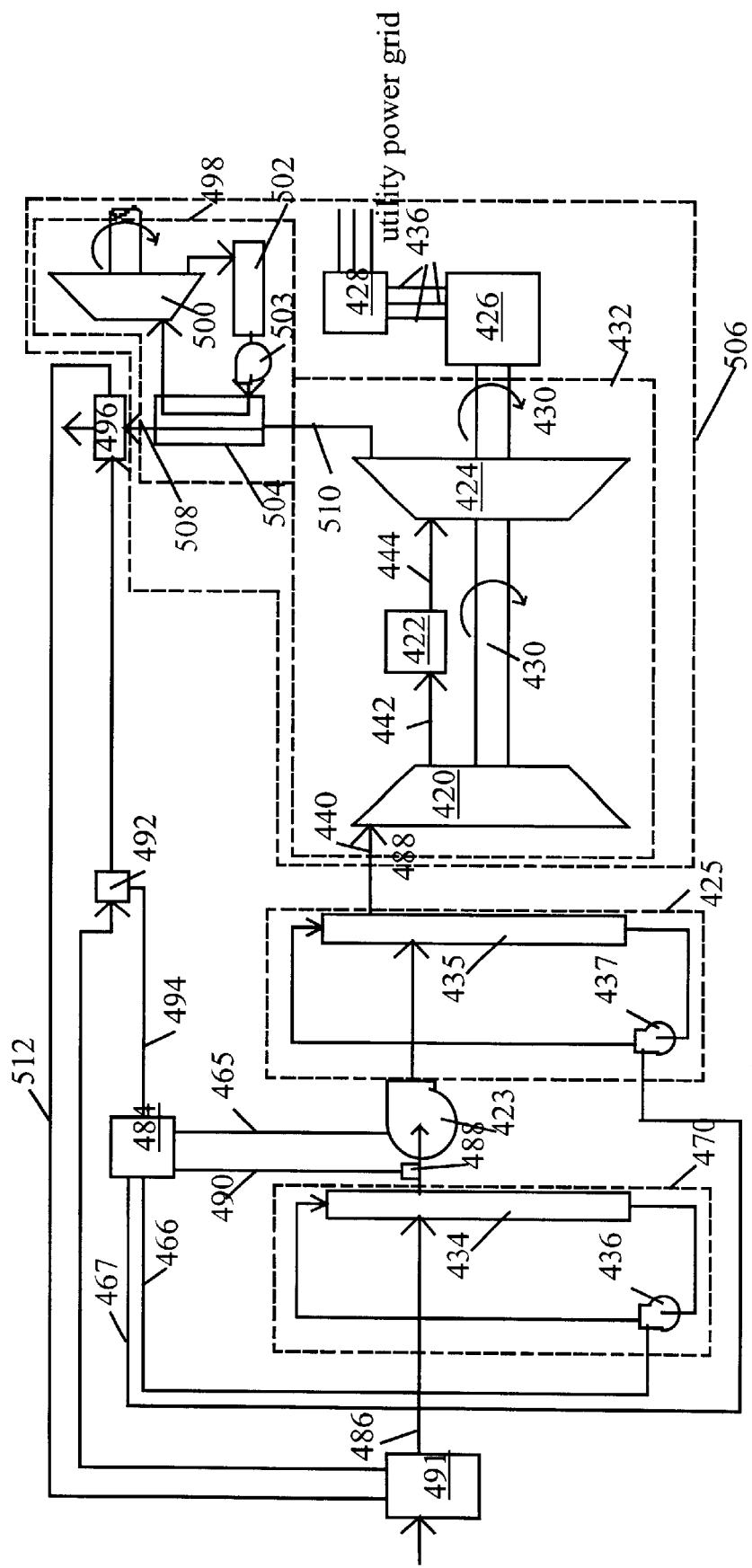
FIG. 13 illustrates an embodiment of the invention employed in a combined-cycle (gas turbine/steam turbine) power plant.

FIG. 13 shows another, similar alternate embodiment that is especially suitable for use with a combined-cycle power plant. A combined-cycle gas turbine power plant 506 includes an additional steam cycle system 498 that utilizes exhaust heat from the turbine 424 to generate additional power. The steam cycle 498 includes a boiler 504, a steam turbine 500, a condenser 502, and a feed water pump 503, which are all connected together in a circuit. A liquid-to-air heat exchanger 491 is provided in a fluid loop with pump 492 and heat recovery heat exchanger 496. The pump 492 circulates heat transfer liquid 512 through the heat recovery heat exchanger 496, where it absorbs heat from exhaust stream 508. The pump receives a signal 494 from controller 484, which regulates flow of the heat transfer liquid 512, thereby controlling the temperature of heated air stream 486 entering the evaporative cooler 470. As with the embodiment in FIG. 12, the controller also can turn off the second evaporative cooler 470 as a first step in controlling turbine inlet temperature, and then ultimately may shut down supercharging altogether.

(One concern with using the exhaust stream 508 as a heat source, however, is corrosion, and corrosion-resistant materials are required to handle the presence of nitric acid and possibly sulfuric acid. One possibility is to use plastic materials for the various conduits, but plastics usually have relatively low temperature limits. Therefore, it may be desirable to mix the exhaust with ambient air to reduce the maximum temperatures, thereby permitting use of plastics. Direct contact liquid-to-gas heat exchange is also an option. The liquid would contain a suitable neutralizing agent (such as sodium bicarbonate) to prevent problems with acidic condensate. Here again it may be desirable to mix the exhaust air stream with ambient air to reduce maximum operating temperatures.)

In addition to an increased overall generating capacity at high ambient temperatures, the system configuration shown in FIG. 13 also should provide enhanced efficiency, since combined cycle power plants actually increase their efficiency slightly at higher compressor inlet temperatures. Moreover, whereas FIG. 13 illustrates a heat transfer loop for recovering waste heat, many other configurations are possible. For example, heat from the condenser 502 could be used to warm the inlet air stream. Providing an air-to-air heat exchanger between the exhaust and inlet air streams is also an option.

The illustrated embodiments described above represent possible configurations of the present invention. While these embodiments use either generator current or compressor inlet temperature as feedback control parameters, other parameters may be used to achieve similar results. For example, control inputs may include generator power; ambient dry-bulb temperature; ambient wet-bulb temperature; shaft torque; or other inputs.

Furthermore, while FIGS. 10 through 13 show a second evaporative cooler located upstream of the supercharging fan, this feature is optional and can be eliminated without a major change in performance. The second evaporative cooler does enhance the pressure capability of the supercharging fan at high ambient temperatures, however, and thus adds some additional output power.

The use of the first evaporative cooler is also optional to some extent, but performance will suffer significantly if it is eliminated. Therefore, only in cases where water and/or space is/are severely limited would it be desirable to eliminate the first evaporative cooler.

Finally, with respect to the various embodiments described above, simple on/off control is the preferred method of control for the supercharging fan. More sophisticated control using variable-speed drives or variable-pitch fan blades is an option, however, and may result in some energy savings, but controlling the burner or inlet temperatures already provides a means for modulating power output.

Figure 14:
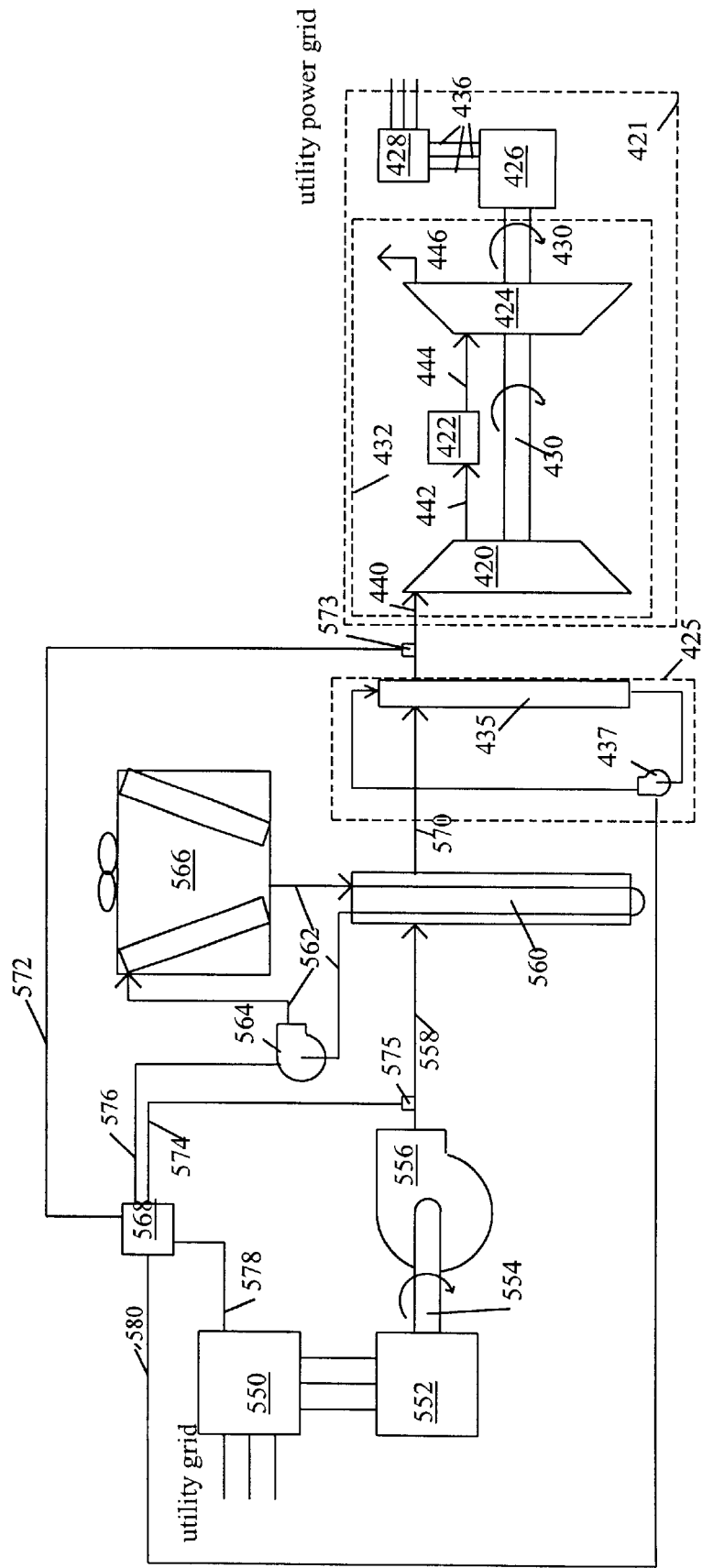
FIG. 14 illustrates a preferred embodiment of the invention which uses a cooling tower and a cooling coil to cool air leaving the supercharging fan.

FIG. 14 illustrates a preferred embodiment that incorporates an indirect evaporative cooling system and a variable-speed drive for the supercharging fan. As illustrated in FIG. 14, a variable-speed drive 550 receives electrical power from the utility grid and supplies variable-frequency AC power to an induction motor 522. The induction motor 552 drives a shaft 554 that drives a supercharging fan 556. The supercharging fan draws ambient air and supplies a pressurized air stream 558 to a cooling coil 560. The cooling coil is a water-to-air heat exchanger that cools the air without adding moisture to it. A cooled air stream 570 exits the coil and enters an evaporative cooler 425, which is configured as described above.

The cooling coil 560 is connected, by means of piping 562, to a pump 564 and a cooling tower 566 to form a circuit, which circuit acts as an indirect evaporative cooler. The cooling tower is preferably a forced-draft wet tower which can cool water to temperatures approaching the ambient wet-bulb temperature.

(In areas where suitable water supplies are limited, an alternative would be to use a dry tower and eliminate the evaporative cooler. In that case, the dry cooling tower and coil assembly would act as a simple heat exchanger between the ambient air and the air leaving the supercharging fan.)

Other heat exchanger and cooling configurations are contemplated. For example, the cooling tower and cooling coil could be replaced with an air-to-air heat located exchanger between an ambient air stream and the air exiting the supercharging fan. In that case, a direct evaporative cooler could be placed upstream of the heat exchanger, on the ambient air side, to provide additional cooling. While these configurations are possible, they are not preferred because the large required heat exchanger area and the large required pressure differential between the two air streams would create the need for a large, expensive heat exchanger.

In climates where freezing presents a potential problem, the piping, cooling coil, and cooling tower would require suitable freeze protection. Possible protection alternatives include insulation and heaters, drain-down provisions, and the use of brine in the cooling coil with a water-to-brine heat exchanger. (A water-to-brine heat exchanger would provide the additional benefit of isolating the cooling coil from the fouling dirt associated wit the cooling tower; an appropriate filter could be included to reduce fouling in systems without a secondary loop.)

In this embodiments, controller 568 prevents overload of the gas turbine at lower ambient temperatures. The controller 568 receives a temperature signal 572 from a temperature sensor 573 located at the compressor inlet, in the compressor inlet air stream 440. The controller also receives a pressure signal 574 from a pressure sensor 575 located in the pressurized air stream 558. The pressure sensor 575 can be located anywhere in the air stream between the supercharging fan 556 and the gas turbine system 432, since the pressure changes are small in this section.

The controller 568 provides a speed control signal 578 to the variable-speed drive 550. This signal modulates the speed of the supercharging fan to maintain the optimum supercharging pressure. The controller also provides an output signal 576 to pump 564 in the cooling tower loop and an output signal 580 to the pump 437 in the evaporative cooler. These two output signals would normally provide a simple on/off control.

While this embodiment uses a variable-frequency drive to control fan speed, there are many other possible ways of modulating fan output that could be used. Examples include electromechanical variable-speed drives such as described in U.S. Pat. No. 5,947,854 and co-pending provisional application Ser. No. 60/164,590; eddy current is clutches; DC motors; variable pitch fan blade; variable inlet vanes; etc.

An important advantage of this embodiment is its ability to supply relatively cooler air to the gas turbine system. The wet bulb temperature of the air entering the cooling tower is unaffected by the energy input from the supercharging fan. Therefore, the cooling coil can cool the airstream 558 to temperatures approaching the ambient wet-bulb temperature without adding any moisture. The evaporative cooler 425 can then further cool and humidify the air stream. As a result, the airstream entering the turbine system can be 10° F. cooler than in the case where a simple direct evaporative cooler is employed. This reduction in temperature provides roughly an additional 2.5% increase in power output from the gas turbine. Because the cooling tower fan and pump typically consume only 10% of this capacity increase, a net capacity improvement of over 2% can be obtained with this system.

More complicated cooling systems are also possible. For example a mechanical, desiccant, or absorption cooling systems may replace the direct evaporative cooler. Cooling systems using ground water or cold lake or ocean water are another option. These systems can achieve much lower air temperatures, which can further enhance the capacity improvement. The disadvantage of this approach is the additional complexity and cost of the additional cooling system.

Figure 15:
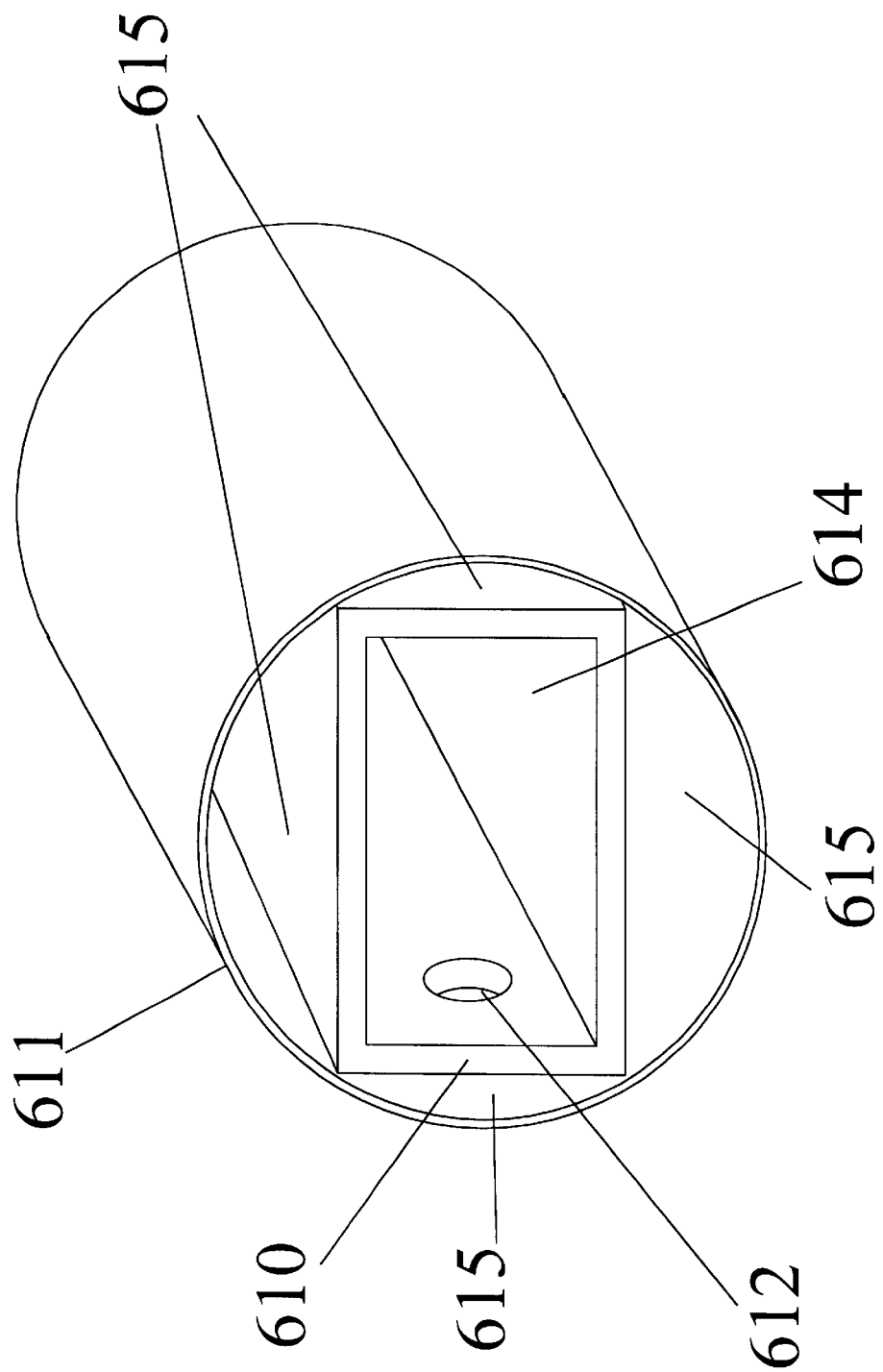
FIG. 15 is a perspective view illustrating the preferred construction configuration of high-pressure ductwork for use with the present invention.

As noted above, the pressurized air streams and the compressor inlet air stream are confined within ducts able to withstand relatively high pressure, and FIG. 15 shows details of the preferred embodiment of such ductwork. An interior duct 610 is disposed inside a round, outer duct 611, and a flow passage 612 equalizes the pressure of a fluid flowing inside the interior duct and a space 615 that is located between the two ducts. (For the present application, the fluid would be air, but the ductwork assembly may be used to convey any high pressure fluid.) Preferably, the space 615 is filled with fluid or may include porous material such as fiberglass, open-cell foam, etc. One advantage of a porous fill material is that it can help to reduce noise and also helps to support the ducts.

The flow passage 612 for equalizing pressure across the interior duct may be simply an aperture or it can be a series of apertures or constituted by a porous surface. The flow passage may also be provided by cracks or other small openings that are common in unsealed ductwork. The critical requirement for the design of the flow passage 612 is that it must be able to permit sufficient fluid flow rates through it to ensure that if a leak develops between the round outer duct and the ambient atmosphere, an excessive pressure drop across the interior duct will not result. Advantageously, the flow path may include a pressure relief valve to reduce the risk of damage to the interior duct if such a leak does occur.

While FIG. 15 shows a rectangular interior duct, the interior duct may have virtually any shape other than a round shape, and it may include large, flat surfaces without concern for excessive strength requirements. The interior duct need only handle any pressure drops, velocity pressure, turbulence, etc. associated with fluid movement through the duct.

The outer duct preferably has a circular cross-section to minimize material requirements. Other shapes such as oval or elliptical may be used, but they are not preferred since they would increase the strength requirements significantly. Large round ducts may include corrugations or other reinforcements to improve rigidity and reduce risk of damage to the duct from wind or accidental loading.

Typical materials for constructing the ducts include metals such as steel or aluminum. Other possible materials include plastic, wood, ceramics, etc. Material selection depends on factors such as strength, cost, and compatibility with the particular fluid flowing through the ducts.

Figures 16A, 16B:
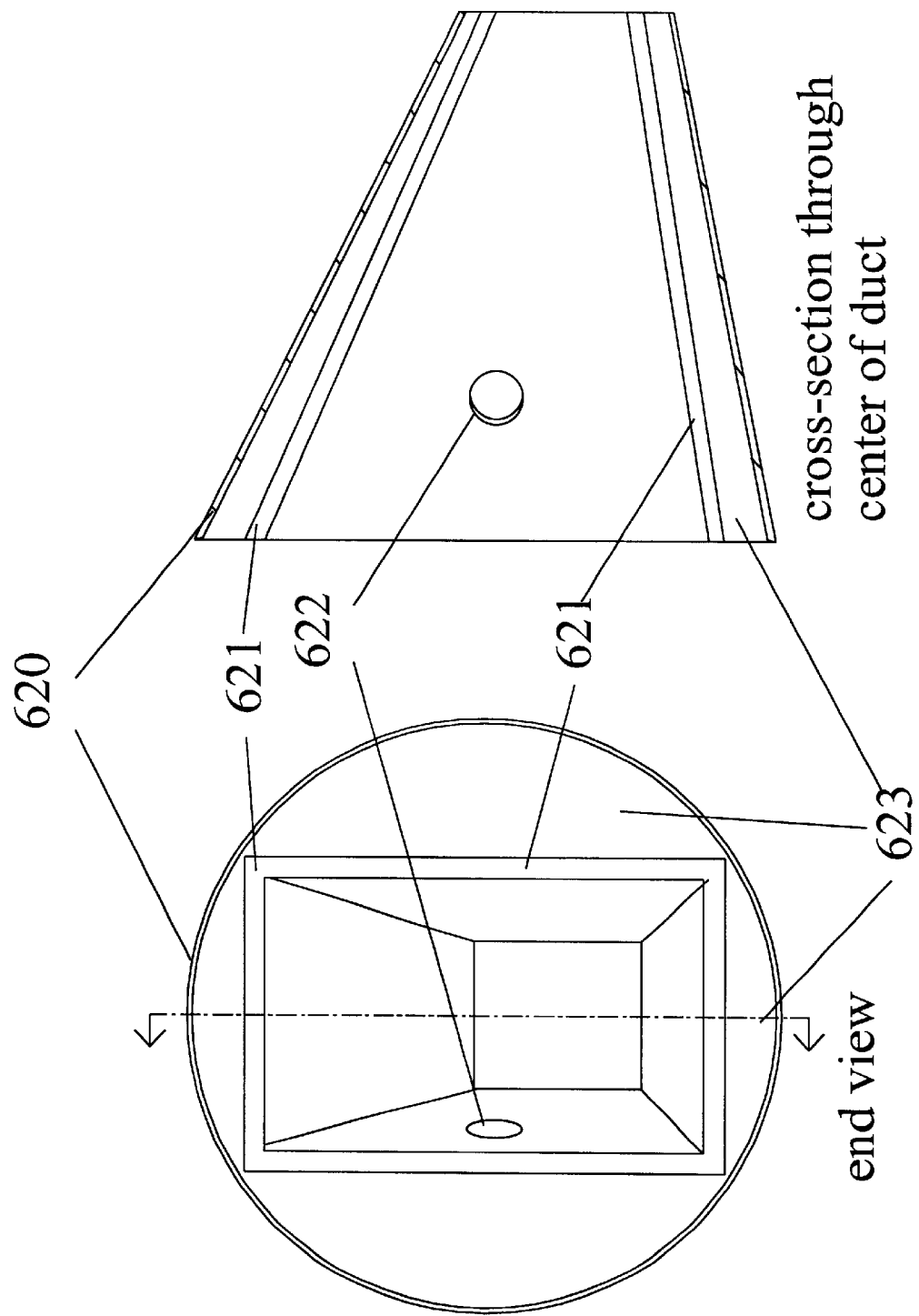
FIGS. 16A and 16B are an end view and a section view, respectively, illustrating construction of a diffuser/flow accelerator section of ductwork constructed as shown in FIG. 15.

FIGS. 16A and 16B show a front and a cross-sectional view, respectively, of a transition duct which may be used to connect two different sized ducts. A circular, conical outer duct 620 encloses a tetrahedral or pyramidoidal interior duct 621. A flow passage 622 is provided in the wall of the interior duct 621 to equalize fluid pressure between the inside of the interior duct 621 and the space 623 that is located between the two ducts. This transitional duct assembly can be used either as a diffuser or a flow accelerator, depending on the direction of fluid flow. Moreover, although FIGS. 15, 16A, and 16B illustrate basic configurations of the high pressure duct according to the invention, this invention can be applied to practically any particular duct geometry, including elbows, tees, transitions, etc.

Figures 17A, 17B:
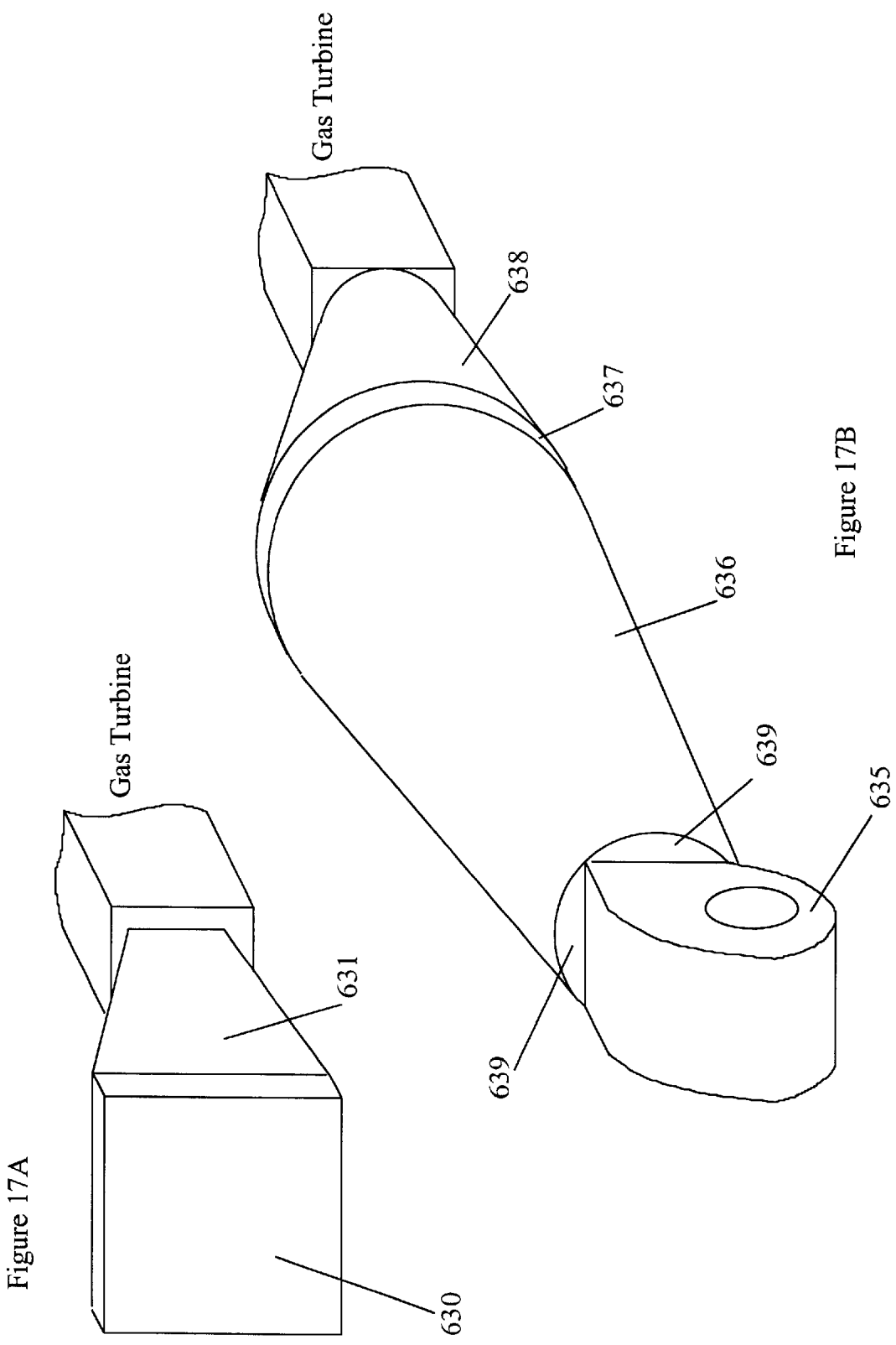
FIGS. 17A and 17B are perspective views illustrating application of the ductwork configuration shown in FIGS. 15, 16A, and 16B to a supercharging fan assembly.

FIGS. 17A and 17B illustrate such ductwork employed specifically with a gas turbine supercharger. FIG. 17A shows the cooler, without a supercharger, with a direct evaporative cooler 630 at the end of a rectangular duct 631 that supplies air to the inlet of a gas turbine. The rectangular duct 631 is designed to carry a pressure difference (as compared to ambient) of just a few inches of water or less.

FIG. 17B shows the corresponding supercharged configuration. The fan 635 increases the air static pressure to very high levels—typically about 60 inches of water. The fan 635 is connected to an end piece 639 of a diffuser duct 636. The diffuser duct is connected to a straight duct 637 that encloses the evaporative cooler and a contraction duct 638. Each of these ducts includes a round duct on the exterior that encloses a rectangular interior duct.

This ductwork arrangement provides several significant advantages over the prior art:
  Lower material weight and cost compared to conventional rectangular ducts;
  Lower pressure drop than conventional round ducts used with rectangular components;
  Simple geometry for easy construction; and
  Ability to retrofit lower-pressure ductwork to withstand higher pressures.

These advantages are especially desirable for use in gas turbine superchargers. The high pressures ( approximately 60 inches of water) and the large duct dimensions (duct diameter of 30 feet or more) create the need for an extremely strong rectangular duct that requires huge amounts of material for reinforcement. The new duct configuration of the invention eliminates the need for the rectangular duct to withstand the high gas pressure, which greatly reduces the material cost and weight. It also allows the use of existing evaporative coolers and associated ducts, which greatly reduces installation cost of the supercharger. While the invention is especially attractive for use in gas turbine superchargers, it can be used in air-conditioning systems and other industrial and commercial applications that require moving gases or liquids.

The advantages of the supercharging system for gas turbines, as a whole, are significant and numerous. Among the most important ones are:

Large increase in turbine capacity at high ambient temperatures;

Ability to achieve a large capacity increase even in humid climates;

Low installed cost;

Simple design;

Compact design;

Flexible control possible;

Can be retrofitted on existing gas turbines;

Bypass damper allows turbine operation without supercharging fan;

Multiple fans and dampers provide redundancy for reliable operation; and

Blower and cooling means work synergistically to give large capacity improvement.

Overall, this system represents a major breakthrough in gas turbine technology. Its simplicity and low-cost make it extremely desirable for power-generation applications that now face major performance penalties at high ambient temperatures. The invention having been thus described, it will become apparent to those skilled in the art that the same may be varied in many ways without departing from the spirit and scope of the invention. Any and all such modifications are intended to be covered within the scope of the following claims.

What is claimed is:

1. A supercharged, power-producing gas turbine system, said system comprising:

a gas turbine subsystem and an electrical generator, said gas turbine subsystem comprising a compressor, a burner, and a gas turbine, wherein a gas turbine subsystem input airstream is compressed by said compressor, heated by said burner, and expanded through said turbine to cause said turbine to rotate, whereby said turbine drives said generator to generate electrical power;

a supercharging subsystem comprising at least one supercharging fan which increases the pressure of said gas turbine subsystem input airstream, whereby power output of said turbine-and hence electrical output of said electrical generator may be increased; and a system controller;

wherein, at summer-peaking conditions, the design pressure increase of said supercharging subsystem corresponds to an output of said turbine that approximately matches the rated unsupercharged output of said generator and said system controller monitors at least one system parameter and controls operation of at least one system component such that as ambient temperature decreases, turbine power output does not exceed a level corresponding to the maximum unsupercharged design output of said generator.

2. The supercharged, power-producing gas turbine system of claim 1, wherein said system controller monitors temperature of said turbine subsystem input airstream.

3. The supercharged, power-producing gas turbine system of claim 2, wherein said system controller controls operation of said at least one supercharging fan as a function of the temperature of said turbine subsystem input airstream.

4. The supercharged, power-producing gas turbine system of claim 1, wherein said system controller monitors pressure of said turbine subsystem input airstream.

5. The supercharged, power-producing gas turbine system of claim 4, wherein said system controller controls operation of said at least one supercharging fan as a function of the pressure of said turbine subsystem input airstream.

6. The supercharged, power-producing gas turbine system of claim 1, wherein said system comprises two or more supercharging fans arranged in parallel, said supercharging fans pressurizing a plenum from which said turbine subsystem input airstream is drawn, said plenum having a bypass damper to permit operation of said system without supercharging fan-pressurization of said turbine subsystem input airstream.

7. The supercharged, power-producing gas turbine system of claim 1, wherein said system comprises two or more supercharging fans arranged in series.

8. The supercharged, power-producing gas turbine system of claim 1, wherein said supercharging subsystem comprises a first air cooler disposed between said at least one supercharging fan and said gas turbine subsystem so as to cool said gas turbine subsystem input airstream.

9. The supercharged, power-producing gas turbine system of claim 8, wherein said first air cooler comprises a direct evaporative cooler.

10. The supercharged, power-producing gas turbine system of claim 8, wherein a secondary airstream is drawn from said gas turbine subsystem input airstream and passed back through said first air cooler to enhance cooling performance of said first air cooler.

11. The supercharged, power-producing gas turbine system of claim 8, wherein said system controller controls operation of said first air cooler as a function of said at least one monitored system parameter.

12. The supercharged, power-producing gas turbine system of claim 11, wherein said first air cooler is an indirect evaporative cooler, said indirect evaporative cooler being disposed in a circuit including a pump and a cooling tower.

13. The supercharged, power-producing gas turbine system of claim 12, wherein said cooling tower is a forced-draft wet tower.

14. The supercharged, power-producing gas turbine system of claim 11, further comprising a second air cooler disposed upstream of said at least one supercharging fan, wherein said system controller also controls operation of said second air cooler as a function of said at least one monitored system parameter.

15. The supercharged, power-producing gas turbine system of claim 1, wherein said system controller monitors ambient air temperature.

16. The supercharged, power-producing gas turbine system of claim 15, wherein said system controller controls operation of said at least one supercharging fan as a function of the ambient air temperature.

17. The supercharged, power-producing gas turbine system of claim 1, wherein said system controller monitors electrical output of said electrical generator and controls operation of said at least one system component as a function thereof.

18. The supercharged, power-producing gas turbine system of claim 1, wherein a recirculation flow system feeds a portion of a compressor outlet airstream back into said gas turbine subsystem input airstream and said system controller controls operation of said recirculation flow system as a function of said at least one monitored system parameter.

19. The supercharged, power-producing gas turbine system of claim 1, wherein said controller controls operation of said burner as a function of said at least one monitored system parameter.

20. The supercharged, power-producing gas turbine system of claim 1, wherein said system further comprises an airstream heater located upstream of said compressor and said system controller controls operation of said airstream heater as a function of said at least one monitored system parameter.

21. The supercharged, power-producing gas turbine system of claim 20, wherein said system controller monitors the temperature of said gas turbine subsystem input airstream and controls operation of said airstream heater as a function thereof.

22. The supercharged, power-producing gas turbine system of claim 20, wherein said airstream heater comprises a first heat exchanger through which circulates a heat-exchanging fluid, said heat-exchanging fluid circulating through a second heat exchanger in which said heat-exchanging fluid absorbs exhaust heat from said gas turbine.

23. The supercharged, power-producing gas turbine system of claim 22, wherein said system comprises a combined-cycle power plant and further includes an auxiliary steam cycle subsystem, said auxiliary steam cycle subsystem utilizing the exhaust heat from said gas turbine to generate additional electrical power.

24. The supercharged, power-producing gas turbine system of claim 1, wherein said supercharging subsystem comprises a variable drive which drives said at least one supercharging fan.

25. The supercharged, power-producing gas turbine system of claim 1, wherein said supercharging subsystem and said system controller are retrofitted to a pre-existing gas turbine subsystem and generator.

26. A supercharging subsystem for use in a supercharged, power-producing gas turbine system, said supercharged, power-producing gas turbine system comprising a gas turbine subsystem and an electrical generator, said gas turbine subsystem comprising a compressor, a burner, and a gas turbine, wherein a gas turbine subsystem input airstream is compressed by said compressor, heated by said burner, and expanded through said turbine to cause said turbine to rotate, whereby said turbine drives said generator to generate electrical power, said supercharging subsystem comprising:
at least one supercharging fan which increases the pressure of said gas turbine subsystem input airstream, whereby power output of said turbine and hence electrical output of said electrical generator may be increased; and
a system controller;
wherein, at summer-pealing conditions, the design pressure increase of said supercharging subsystem corresponds to an output of said turbine that approximately matches the rated unsupercharged output of said generator and said system controller monitors at least one system parameter and controls operation of at least one system component such that as ambient temperature decreases, turbine power output, which otherwise would increase with decreasing ambient temperature, does not exceed a level corresponding to the maximum unsupercharged design output of said generator.

27. The supercharging subsystem of claim 26, wherein said system controller monitors temperature of said turbine subsystem input airstream.

28. The supercharging subsystem of claim 27, wherein said system controller controls operation of said at least one supercharging fan as a function of the temperature of said turbine subsystem input airstream.

29. The supercharging subsystem of claim 26, wherein said system controller monitors pressure of said turbine subsystem input airstream.

30. The supercharging subsystem of claim 29, wherein said system controller controls operation of said at least one supercharging fan as a function of the pressure of said turbine subsystem input airstream.

31. The supercharging subsystem of claim 26, wherein said system comprises two or more supercharging fans arranged in parallel, said supercharging fans pressurizing a plenum from which said turbine subsystem input airstream is drawn, said plenum having a bypass damper to permit operation of said system without supercharging fan-pressurization of said turbine subsystem input airstream.

32. The supercharging subsystem of claim 26, wherein said system comprises two or more supercharging fans arranged in series.

33. The supercharging subsystem of claim 26, wherein said supercharging subsystem comprises a first air cooler disposed between said at least one supercharging fan and said gas turbine subsystem so as to cool said gas turbine subsystem input airstream.

34. The supercharging subsystem of claim 33, wherein said first air cooler comprises a direct evaporative cooler.

35. The supercharging subsystem of claim 33, wherein a secondary airstream is drawn from said gas turbine subsystem input airstream and passed back through said first air cooler to enhance cooling performance of said first air cooler.

36. The supercharging subsystem of claim 33, wherein said system controller controls operation of said first air cooler as a function of said at least one monitored system parameter.

37. The supercharging subsystem of claim 36, wherein said first air cooler is an indirect evaporative cooler, said indirect evaporative cooler being disposed in a circuit including a pump and a cooling tower.

38. The supercharging subsystem of claim 37, wherein said cooling tower is a forced-draft wet tower.

39. The supercharging subsystem of claim 36, further comprising a second air cooler disposed upstream of said at least one supercharging fan, wherein said system controller also controls operation of said second air cooler as a function of said at least one monitored system parameter.

40. The supercharging subsystem of claim 26, wherein said system controller monitors ambient air temperature.

41. The supercharging subsystem of claim 40, wherein said system controller controls operation of said at least one supercharging fan as a function of the ambient air temperature.

42. The supercharging subsystem of claim 26, wherein said system controller monitors electrical output of said electrical generator and controls operation of said at least one system component as a function thereof.

43. The supercharging subsystem of claim 26, wherein a recirculation flow system feeds a portion of a compressor outlet airstream back into said gas turbine subsystem input airstream and said system controller controls operation of said recirculation flow system as a function of said at least one monitored system parameter.

44. The supercharging subsystem of claim 26, wherein said controller controls operation of said burner as a function of said at least one monitored system parameter.

45. The supercharging subsystem of claim 26, wherein said subsystem further comprises an airstream heater located upstream of said compressor and said system controller controls operation of said airstream heater as a function of said at least one monitored system parameter.

46. The supercharging subsystem of claim 45, wherein said system controller monitors the temperature of said gas turbine subsystem input airstream and controls operation of said airstream heater as a function thereof.

47. The supercharging subsystem of claim 45, wherein said airstream heater comprises a first heat exchanger through which circulates a heat-exchanging fluid, said heat-exchanging fluid circulating through a second heat exchanger in which said heat-exchanging fluid absorbs exhaust heat from said gas turbine.

48. The supercharging subsystem of claim 26, wherein said supercharging subsystem comprises a variable drive which drives said at least one supercharging fan.

49. A method of operating a supercharged, power-producing gas turbine system including a generator sized to achieve a maximum rated power output at a maximum unsupercharged turbine output, said method comprising the steps of monitoring at least one system parameter and controlling operation of at least one system component such that as ambient temperature decreases, power output of said gas turbine system does not exceed said maximum rated power output of said generator.

50. A supercharged, power-producing gas turbine system, said system comprising:

a gas turbine subsystem and an electrical generator, said gas turbine subsystem comprising a compressor, a burner, and a gas turbine, wherein a gas turbine subsystem input airstream is compressed by said compressor, heated by said burner, and expanded through said turbine to cause said turbine to rotate, whereby said turbine drives said generator to generate electrical power;

a supercharging subsystem comprising at least one supercharging fan which increases the pressure of said gas turbine subsystem input airstream, whereby power output of said turbine and hence electrical output of said electrical generator may be increased;

a system controller;

wherein said system controller monitors at least one system parameter and controls operation of at least one system component such that as ambient temperature decreases, turbine power output, which otherwise would increase with decreasing ambient temperature, does not exceed maximum supercharged summer-peaking power output; and a duct for conveying a high-pressure airstream through said system, said duct comprising an interior conduit disposed within an exterior conduit, said interior conduit having a polygonal cross-section and said exterior conduit having an arcuate cross-section, said interior conduit and said exterior conduit defining a space therebetween and said interior conduit having a flow passage in a wall thereof to provide fluid communication and equalize pressure between the interior of said interior conduit and said space.

51. In a supercharged gas turbine power plant having a gas turbine power system including a compressor, a burner, and a gas turbine, wherein an inlet air stream fed to the system is compressed by the compressor, heated by the burner, and expanded through the turbine to cause the turbine to rotate, whereby the turbine drives an electrical generator to generate electrical power; and having a supercharging system for increasing the pressure of the inlet air stream fed to the compressor to provide a pressurized inlet air stream to the compressor, the improvement comprising:

a duct having a round cross sectional area that provides a flow path between said supercharging system and said gas-turbine power system for said pressurized inlet air stream.

* * * * *